United States Patent
Richert et al.

(10) Patent No.: US 11,042,775 B1
(45) Date of Patent: Jun. 22, 2021

(54) APPARATUS AND METHODS FOR TEMPORAL PROXIMITY DETECTION

(71) Applicant: BRAIN Corporation, San Diego, CA (US)

(72) Inventors: Micah Richert, San Diego, CA (US); Filip Piekniewski, San Diego, CA (US)

(73) Assignee: Brain Corporation, San Diego, CA (US)

( * ) Notice: Subject to any disclaimer, the term of this patent is extended or adjusted under 35 U.S.C. 154(b) by 1129 days.

(21) Appl. No.: 15/187,533

(22) Filed: Jun. 20, 2016

Related U.S. Application Data

(63) Continuation of application No. 14/191,383, filed on Feb. 26, 2014, now Pat. No. 9,373,038.

(51) Int. Cl.
*G06K 9/62* (2006.01)
*G06N 3/04* (2006.01)

(52) U.S. Cl.
CPC ........... *G06K 9/6215* (2013.01); *G06N 3/049* (2013.01)

(58) Field of Classification Search
CPC ............ G06K 9/6215; G06K 9/00711; G06K 9/4671; G06T 7/246; G06N 3/049; G06N 3/08
See application file for complete search history.

(56) References Cited

U.S. PATENT DOCUMENTS

| | | |
|---|---|---|
| 5,063,603 A | 11/1991 | Burt |
| 5,138,447 A | 8/1992 | Shen et al. |

(Continued)

FOREIGN PATENT DOCUMENTS

| | | |
|---|---|---|
| CN | 102226740 A | 10/2011 |
| JP | H0487423 A | 3/1992 |

(Continued)

OTHER PUBLICATIONS

R. Athilingam, K. Senthil Kumar, and G.Kavitha. "Neuronal Mapped Hybrid Background Segmentation for Video Object Tracking", 2012, 2012 International Conference on Computing, Electronics and Electrical Technologies [ICCEET], pp. 1061-1066. (Year: 2012).*

(Continued)

*Primary Examiner* — Kamran Afshar
*Assistant Examiner* — Ying Yu Chen
(74) *Attorney, Agent, or Firm* — Reed Smith LLP; Sidharth Kapoor

(57) ABSTRACT

A data processing apparatus may utilize an artificial neuron network configured to reduce dimensionality of input data using a sparse transformation configured using receptive field structure of network units. Output of the network may be analyzed for temporally persistency that is characterized by similarity matrix. Elements of the matrix may be incremented when present activity unit activity at a preceding frame. The similarity matrix may be partitioned based on a distance measure for a given element of the matrix and its closest neighbors. Stability of learning of temporally proximal patterns may be greatly improved as the similarity matrix is learned independently of the partitioning operation. Partitioning of the similarity matrix using the methodology of the disclosure may be performed online, e.g., contemporaneously with the encoding and/or similarity matrix construction, thereby enabling learning of new features in the input data.

23 Claims, 11 Drawing Sheets

(56) References Cited

U.S. PATENT DOCUMENTS

| | | | |
|---|---|---|---|
| 5,216,752 A | 6/1993 | Tam | |
| 5,272,535 A | 12/1993 | Elabd | |
| 5,355,435 A | 10/1994 | Deyong et al. | |
| 5,638,359 A | 6/1997 | Peltola et al. | |
| 5,673,367 A | 9/1997 | Buckley | |
| 5,875,108 A | 2/1999 | Hoffberg et al. | |
| 6,009,418 A | 12/1999 | Cooper | |
| 6,014,653 A | 1/2000 | Thaler | |
| 6,035,389 A | 3/2000 | Grochowski et al. | |
| 6,418,424 B1 | 7/2002 | Hoffberg et al. | |
| 6,458,157 B1 | 10/2002 | Suaning | |
| 6,501,794 B1 | 12/2002 | Wang et al. | |
| 6,509,854 B1 | 1/2003 | Morita et al. | |
| 6,545,705 B1 | 4/2003 | Sigel et al. | |
| 6,545,708 B1 | 4/2003 | Tamayama et al. | |
| 6,546,291 B2 | 4/2003 | Merfeld et al. | |
| 6,581,046 B1 | 6/2003 | Ahissar | |
| 6,625,317 B1 | 9/2003 | Gaffin et al. | |
| 6,678,590 B1 | 1/2004 | Burchfiel | |
| 7,016,783 B2 | 3/2006 | Hac et al. | |
| 7,113,867 B1 | 9/2006 | Stein | |
| 7,142,602 B2 | 11/2006 | Porikli et al. | |
| 7,430,682 B2 | 9/2008 | Carlson et al. | |
| 7,447,337 B2 | 11/2008 | Zhang et al. | |
| 7,580,907 B1 | 8/2009 | Rhodes | |
| 7,653,255 B2 | 1/2010 | Rastogi | |
| 7,737,933 B2 | 6/2010 | Yamano et al. | |
| 7,849,030 B2 | 12/2010 | Ellingsworth | |
| 8,000,967 B2 | 8/2011 | Taleb | |
| 8,015,130 B2 | 9/2011 | Matsugu et al. | |
| 8,103,602 B2 | 1/2012 | Izhikevich | |
| 8,108,147 B1 | 1/2012 | Blackburn | |
| 8,160,354 B2 | 4/2012 | Paquier | |
| 8,200,593 B2 | 6/2012 | Guillen et al. | |
| 8,311,965 B2 | 11/2012 | Breitwisch et al. | |
| 8,315,305 B2 | 11/2012 | Petre et al. | |
| 8,346,692 B2 * | 1/2013 | Rouat | G06K 9/4623 706/20 |
| 8,390,707 B2 | 3/2013 | Yamashita | |
| 8,416,847 B2 | 4/2013 | Roman | |
| 8,467,623 B2 | 6/2013 | Izhikevich et al. | |
| 8,542,875 B2 | 9/2013 | Eswara | |
| 8,712,939 B2 | 4/2014 | Szatmary et al. | |
| 8,756,183 B1 * | 6/2014 | Daily | G06N 3/049 706/20 |
| 8,818,923 B1 * | 8/2014 | Hoffmann | G06N 3/082 706/18 |
| 9,150,220 B2 | 10/2015 | Clarke et al. | |
| 9,256,823 B2 * | 2/2016 | Sinyavskiy | G06N 3/049 |
| 2002/0038294 A1 | 3/2002 | Matsugu | |
| 2002/0176025 A1 | 11/2002 | Kim et al. | |
| 2003/0050903 A1 | 3/2003 | Liaw et al. | |
| 2003/0216919 A1 | 11/2003 | Roushar | |
| 2004/0054964 A1 | 3/2004 | Bozdagi et al. | |
| 2004/0136439 A1 | 7/2004 | Dewberry et al. | |
| 2004/0170330 A1 | 9/2004 | Fogg et al. | |
| 2004/0193670 A1 | 9/2004 | Langan et al. | |
| 2004/0233987 A1 | 11/2004 | Porikli et al. | |
| 2005/0015351 A1 | 1/2005 | Nugent | |
| 2005/0036649 A1 | 2/2005 | Yokono et al. | |
| 2005/0047647 A1 | 3/2005 | Rutishauser et al. | |
| 2005/0096539 A1 | 5/2005 | Leibig et al. | |
| 2005/0283450 A1 | 12/2005 | Matsugu et al. | |
| 2006/0088191 A1 | 4/2006 | Zhang et al. | |
| 2006/0094001 A1 | 5/2006 | Torre et al. | |
| 2006/0127042 A1 | 6/2006 | Park et al. | |
| 2006/0129728 A1 | 6/2006 | Hampel | |
| 2006/0161218 A1 | 7/2006 | Danilov | |
| 2006/0188168 A1 | 8/2006 | Sheraizin et al. | |
| 2007/0022068 A1 | 1/2007 | Linsker | |
| 2007/0071100 A1 | 3/2007 | Shi et al. | |
| 2007/0176643 A1 | 8/2007 | Nugent | |
| 2007/0208678 A1 | 9/2007 | Matsugu | |
| 2008/0043848 A1 | 2/2008 | Kuhn | |
| 2008/0100482 A1 | 5/2008 | Lazar | |
| 2008/0152236 A1 | 6/2008 | Vendrig et al. | |
| 2008/0174700 A1 | 7/2008 | Takaba | |
| 2008/0199072 A1 | 8/2008 | Kondo et al. | |
| 2008/0205764 A1 | 8/2008 | Iwai et al. | |
| 2008/0237446 A1 | 10/2008 | Oshikubo et al. | |
| 2008/0252723 A1 | 10/2008 | Park | |
| 2008/0267458 A1 | 10/2008 | Laganiere et al. | |
| 2009/0028384 A1 | 1/2009 | Bovyrin et al. | |
| 2009/0043722 A1 | 2/2009 | Nugent | |
| 2009/0096927 A1 | 4/2009 | Camp, Jr. et al. | |
| 2009/0141938 A1 | 6/2009 | Lim et al. | |
| 2009/0202114 A1 | 8/2009 | Morin et al. | |
| 2009/0287624 A1 | 11/2009 | Rouat et al. | |
| 2009/0304231 A1 | 12/2009 | Lu et al. | |
| 2009/0312985 A1 | 12/2009 | Eliazar | |
| 2009/0323809 A1 | 12/2009 | Raveendran | |
| 2010/0036457 A1 | 2/2010 | Sarpeshkar et al. | |
| 2010/0073371 A1 | 3/2010 | Ernst et al. | |
| 2010/0080297 A1 | 4/2010 | Wang et al. | |
| 2010/0081958 A1 | 4/2010 | She | |
| 2010/0086171 A1 | 4/2010 | Lapstun | |
| 2010/0100482 A1 | 4/2010 | Hardt | |
| 2010/0166320 A1 | 7/2010 | Paquier | |
| 2010/0225824 A1 | 9/2010 | Lazar et al. | |
| 2010/0235310 A1 | 9/2010 | Gage et al. | |
| 2010/0271511 A1 | 10/2010 | Ma et al. | |
| 2010/0290530 A1 | 11/2010 | Huang et al. | |
| 2010/0299296 A1 | 11/2010 | Modha et al. | |
| 2011/0016071 A1 | 1/2011 | Guillen et al. | |
| 2011/0063409 A1 | 3/2011 | Hannuksela | |
| 2011/0103480 A1 | 5/2011 | Dane | |
| 2011/0119214 A1 | 5/2011 | Breitwisch et al. | |
| 2011/0119215 A1 | 5/2011 | Elmegreen et al. | |
| 2011/0134242 A1 | 6/2011 | Loubser et al. | |
| 2011/0137843 A1 | 6/2011 | Poon et al. | |
| 2011/0160741 A1 | 6/2011 | Asano et al. | |
| 2011/0170792 A1 | 7/2011 | Tourapis et al. | |
| 2011/0206122 A1 | 8/2011 | Lu et al. | |
| 2011/0222603 A1 | 9/2011 | Le Barz et al. | |
| 2011/0228092 A1 | 9/2011 | Park | |
| 2011/0242341 A1 | 10/2011 | Agrawal et al. | |
| 2012/0011090 A1 | 1/2012 | Tang et al. | |
| 2012/0057634 A1 | 3/2012 | Shi et al. | |
| 2012/0083982 A1 | 4/2012 | Bonefas et al. | |
| 2012/0084240 A1 | 4/2012 | Esser et al. | |
| 2012/0109866 A1 | 5/2012 | Modha | |
| 2012/0130566 A1 | 5/2012 | Anderson et al. | |
| 2012/0162450 A1 | 6/2012 | Park et al. | |
| 2012/0212579 A1 | 8/2012 | Frojdh et al. | |
| 2012/0236114 A1 | 9/2012 | Chang et al. | |
| 2012/0243733 A1 | 9/2012 | Sawai | |
| 2012/0256941 A1 | 10/2012 | Ballestad et al. | |
| 2012/0303091 A1 | 11/2012 | Izhikevich | |
| 2012/0308076 A1 | 12/2012 | Piekniewski et al. | |
| 2012/0308136 A1 | 12/2012 | Izhikevich et al. | |
| 2012/0330447 A1 | 12/2012 | Gerlach et al. | |
| 2013/0022111 A1 | 1/2013 | Chen et al. | |
| 2013/0050574 A1 | 2/2013 | Lu et al. | |
| 2013/0051680 A1 | 2/2013 | Kono et al. | |
| 2013/0058535 A1 * | 3/2013 | Othmezouri | G06K 9/6215 382/103 |
| 2013/0073484 A1 | 3/2013 | Izhikevich et al. | |
| 2013/0073491 A1 | 3/2013 | Izhikevich et al. | |
| 2013/0073492 A1 | 3/2013 | Izhikevich et al. | |
| 2013/0073495 A1 | 3/2013 | Izhikevich et al. | |
| 2013/0073496 A1 | 3/2013 | Szatmary et al. | |
| 2013/0073498 A1 | 3/2013 | Izhikevich et al. | |
| 2013/0073499 A1 | 3/2013 | Izhikevich et al. | |
| 2013/0073500 A1 | 3/2013 | Szatmary et al. | |
| 2013/0148882 A1 | 6/2013 | Lee | |
| 2013/0151450 A1 | 6/2013 | Ponulak | |
| 2013/0176430 A1 | 7/2013 | Zhu et al. | |
| 2013/0218821 A1 | 8/2013 | Szatmary et al. | |
| 2013/0251278 A1 | 9/2013 | Izhikevich et al. | |
| 2013/0297539 A1 | 11/2013 | Piekniewski et al. | |
| 2013/0297541 A1 | 11/2013 | Piekniewski et al. | |
| 2013/0297542 A1 | 11/2013 | Piekniewski et al. | |
| 2013/0325766 A1 | 12/2013 | Petre et al. | |
| 2013/0325768 A1 | 12/2013 | Sinyavskiy et al. | |

(56) References Cited

U.S. PATENT DOCUMENTS

| | | |
|---|---|---|
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325777 A1 | 12/2013 | Petre et al. |
| 2014/0012788 A1 | 1/2014 | Piekniewski |
| 2014/0016858 A1 | 1/2014 | Richert |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0064609 A1 | 3/2014 | Petre et al. |
| 2014/0119654 A1 | 5/2014 | Taylor et al. |
| 2014/0122397 A1 | 5/2014 | Richert et al. |
| 2014/0122398 A1 | 5/2014 | Richert |
| 2014/0122399 A1 | 5/2014 | Szatmary et al. |
| 2014/0156574 A1 | 6/2014 | Piekniewski et al. |
| 2014/0201126 A1 | 7/2014 | Zadeh et al. |
| 2014/0241612 A1 | 8/2014 | Rhemann et al. |
| 2014/0379179 A1 | 12/2014 | Goossen et al. |
| 2015/0077639 A1 | 3/2015 | Chamaret et al. |
| 2015/0127154 A1 | 5/2015 | Passot et al. |
| 2015/0127155 A1 | 5/2015 | Passot et al. |
| 2015/0181168 A1 | 6/2015 | Pahalawatta et al. |
| 2015/0217449 A1 | 8/2015 | Meier et al. |
| 2015/0281715 A1 | 10/2015 | Lawrence et al. |
| 2015/0304634 A1 | 10/2015 | Karvounis |
| 2016/0009413 A1 | 1/2016 | Lee et al. |

FOREIGN PATENT DOCUMENTS

| | | |
|---|---|---|
| RU | 2108612 C1 | 4/1998 |
| RU | 2406105 C2 | 12/2010 |
| RU | 2424561 C2 | 7/2011 |
| WO | WO-2008083335 A2 | 7/2008 |
| WO | WO-2008132066 A1 | 11/2008 |

OTHER PUBLICATIONS

Santaji Ghorpade, Jayshree Ghorpade, Shamla Mantri, and Dhanaji Ghorpade, "Neural Networks for Face Recognition Using SOM", Dec. 2010, IJCST vol. 1, Iss ue 2, pp. 65-67. (Year: 2010).*
Josef Sivic and Andrew Zisserman, "Video Google: A Text Retrieval Approach to Object Matching in Videos", 2003, Proceedings of the Ninth IEEE International Conference on Computer Vision (ICCV'03), p. 1-8. (Year: 2003).*
Berkes, et al., Slow feature analysis yields a rich repertoire of complex cell properties. Journal of Vision (2005) vol. 5 (6).
Bohte, 'Spiking Nueral Networks' Doctorate at the University of Leiden, Holland, Mar. 5, 2003, pp. 1-133 [retrieved on Nov. 14, 2012]. Retrieved from the interne http://homepages.cwi.nl/~sbohte/publication/phdthesis.pdf<url: />.
Brette et al., Brian: a simple and flexible simulator for spiking neural networks, The Neuromorphic Engineer, Jul. 1, 2009, pp. 1-4, doi: 10.2417/1200906.1659.
Cessac et al. 'Overview of facts and issues about neural coding by spikes.' Journal of Physiology, Paris 104.1 (2010): 5.
Cuntz et al., 'One Rule to Grow Them All: A General Theory of Neuronal Branching and its Paractical Application' PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Dorval et al. 'Probability distributions of the logarithm of interspike intervals yield accurate entropy estimates from small datasets.' Journal of neuroscience methods 173.1 (2008): 129.
Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.
Field, G., et al., Information Processing in the Primate Retina: Circuitry and Coding, Annual Review of Neuroscience, 2007, 30(1), 1-30.
Fiete, et al, Spike-Time-Dependent Plasticity and Heterosynaptic Competition Organize Networks to Produce Long Scale-Free Sequences of Neural Activity. Neuron 65, Feb. 25, 2010, pp. 563-576.
Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.
Florian (2003), Biologically Inspired Neural Networks for the Control of Embodied Agents, Technical Report Coneural-03-03 Version 1.0 [online], Nov. 30, 2003 [retrieved on Nov. 24, 2014]. Retrieved from the Internet: <url:http: download?doi="10.1.1.216.4931-"&rep1&type="pdf"></url:http:>.
Foldiak, P. Learning invariance from transformation sequences. Neural Computation, 1991, 3(2), 194-200.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.
Gerstner et al. (1996) A neuronal learning rule for sub-millisecond temporal coding. Nature vol. 383 (6595) pp. 76-78.
Gewaltig et al.. 'NEST (Neural Simulation Tool)', Scholarpedia, 2007. pp. I-15. 2(4): 1430, doi: 1 0.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gluck, Stimulus Generalization and Representation in Adaptive Network Models of Category Learning [online], 1991 [retrieved on Aug. 24, 2013]. Retrieved from the Internet:<URL:http:// www.google.coinlurl ?sa-t&rct-j&q-Giuck+ 4)/022STIMULUS+GENERALIZATION+AND+REPRESENTATIO N+1N +ADAPTIVE+NETWORK+MODELS±0f+CATEGORY+LEARN ING%22+ 1991.
Gollisch et al., 'Rapid neural coding in the retina with relative spike latencies.' Science 319.5866 (2008): 1108-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.
Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.
Hopfield JJ (1995) Pattern recognition computation using action potential timing for stimulus representation.Nature 376: 33-36.
Izhikevich E.M. (2004) Which Model to Use for Cortical Spiking Neurons? IEEE Transactions on Neural Networks, 15:1063-1070.
Izhikevich E.M. (2006) Polychronization: Computation With Spikes. Neural Computation, 18:245-282.
Izhikevich, E,M. (2007) Dynamical Systems in Neuroscience: The Geometry of Excitability and Bursting, The MIT Press, 2007.
Izhikevich, E.M, et al. (2009), Polychronous Wavefront Computations. International Journal of Bifurcation and Chaos, 19:1733-1739.
Izhikevich et al., 'Relating STDP to BCM', Neural Computation (2003) 15, 1511-1523.
Izhikevich, 'Simple Model of Spiking Neurons', IEEE Transactions on Neural Networks, vol. 14, No. 6, Nov. 2003, pp. 1569-1572.
Janowitz, M.K., et al., Excitability changes that complement Hebbian learning. Network, Computation in Neural Systems, 2006, 17 (1), 31-41.
Karbowski et al., 'Multispikes and Synchronization in a Large Neural Network with Temporal Delays', Neural Computation 12. 1573-1606 (2000).
Khotanzad. 'Classification of invariant image representations using a neural network' IEEE. Transactions on Acoustics, Speech, and

(56) References Cited

OTHER PUBLICATIONS

Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf.

Knoblauch, et al., Memory Capacities for Synaptic and Structural Plasticity, Neural Computation 2009, pp. 1-45.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.

Laurent, 'The Neural Network Query Language (NNQL) Reference' [retrieved on Nov. 12, 2013]. Retrieved from the Internet: <URL'https://code.google.com/p/ nnql/issues/detail?id=1>.

Lazar et al. 'A video time encoding machine', in Proceedings of the 15th IEEE International Conference on Image Processing ICIP '08 2008, pp. 717-720.

Lazar, et al., "Consistent recovery of sensory stimuli encoded with MIMO neural circuits," Computational intelligence and neuroscience, 2010.

Lazar, et al., 'Multichannel time encoding with integrate-and-fire neurons.' Neurocomputing 65 (2005): 401-407.

Masquelier, et al., Learning to recognize objects using waves of spikes and Spike Timing-Dependent Plasticity. Neural Networks (IJCNN), The 2010 International Joint Conference on DOI-10.1109/1JCNN.2010.5596934 (2010) pp. 1-8.

Masquelier, Timothee, 'Relative spike time coding and STOP-based orientation selectivity in the early visual system in natural continuous and saccadic vision: a computational model.' Journal of computational neuroscience 32.3 (2012): 425-441.

Meister, et al., The neural code of the retina, Neuron, 1999, 22, 435-450.

Meister, M, Multineuronal codes in retinal signaling. Proceedings of the National Academy of sciences. 1996, 93, 609-614.

Nichols, A Reconfigurable Computing Architecture for Implementing Artificial Neural Networks on FPGA, Master's Thesis, The University of Guelph, 2003, pp. 1-235.

Oster, M., et al., A Spike-Based Saccadic Recognition System, ISCAS 2007. IEEE International Symposium on Circuits and Systems, 2009, pp, 3083-3086.

Paugam-Moisy, et al., "Computing with Spiking Neuron Networks" Handbook of Natural Computing, 40 pages Springer, Heidelberg (2009).

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu!viewdoc/download?doi=0.1.1.5.4346&rep-repl&type-pdf.

Rekeczky, et al., "Cellular Multiadaptive Analogic Architecture: A Computational Framework for UAV Applications." May 2004.

Revow, M., et al., 1996, Using Generative Models for Handwritten Digit Recognition, IEEE Trans. on Pattern Analysis and Machine Intelligence, 18, No. 6, Jun. 1996.

Sanchez, Efficient Simulation Scheme for Spiking Neural Networks. Doctoral Thesis. (Juiversita di Granada Mar. 28, 2008, pp. 1-104.

Sato et al., 'Pulse interval and width modulation for video transmission.' Cable Television, IEEE Transactions on 4 (1978): 165-173.

Schemmel, J., et al., Implementing synaptic plasticity in a VLSI spiking neural network model. In: Proceedings of the 2006 International Joint Conference on Neural Networks (IJCNN'06), IEEE Press (2006) Jul. 16-21, 2006, pp. 1-6 [online], [retrieved on Aug. 24, 2012]. Retrieved from the Internet <url:> Introduction</url:>.

Schnitzer, M.J., et al., Multineuronal Firing Patterns in the Signal from Eye to Brain. Neuron, 2003, 37, 499-511.

Serrano-Gotarredona, et al, "On Real-Time: AER 2-D Convolutions Hardware for Neuromorphic Spike-based Cortical Processing", Jul. 2008.

Simulink.RTM. model [online], [Retrieved on Dec. 10, 2013] Retrieved from &It:URL: http://www.mathworks.com/ products/simulink/index.html>.

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbiol.org/article/info%3Adoi% 2F10.137%2Fjournal,pcbi.1000879<url:></url:>.

Thomas, S., et al, (2004), Realistic Modeling of Simple and Complex Cell Tuning in the HMAX Model, and Implications for Invariant Object Recognition in Cortex, AI Memo 2004-017 Jul. 2004.

Thorpe S.; Ultra-Rapid Scene Categorization with a Wave of Spikes. In H,H. Bulthoff et al. (eds.), Biologically Motivated Computer Vision, Lecture Notes in Computer Science, 2002, 2525, pp. 1-15, Springer-Verlag, Berlin.

Thorpe, S.J., et al. (2001), Spike-based strategies for rapid processing. Neural Networks 14, pp. 715-725.

Thorpe, S.J., et al. (2004), SpikeNet: real-time visual processing with one spike per neuron, Neurocomputing, 58-60, pp. 857-864.

Van Rullen, et al. (2003), Is perception discrete or continuous? Trends in Cognitive Sciences 7(5), pp. 207-213.

Van Rullen, R., et al (2005), Spike times make sense. Trends in Neurosciences 28(1).

Van Rullen R., et al., Rate Coding versus temporal order coding: What the Retinal ganglion cells tell the visual cortex. Neural computation, 2001, 13, 1255-1283.

Wallis, G., et al., A model of invariant object recognition in the visual system, Progress in Neurobiology. 1997, 51, 167-194.

Wang 'The time dimension for scene analysis.' Neural Networks, IEEE Transactions on 16.6 (2005): 1401-1426.

Wiskott, L., et al., Slow feature analysis: Unsupervised learning of invariances, Neural Computation, 2002, 14, (4), 715-770.

Wysoski et al, "Fast and Adaptive Network of Spiking Neuron for Multi-view Visual Pattern Recognition", May 3, 2008, Elsevier,Neurocomputing vol. 71, pp. 2563-2575.

Zarandy, et al., "Bi-i: A Standalone Ultra High Speed Cellular Vision System." In: [online]. Dated Jun. 13, 2005 (Jun. 13, 2005). Retrieved on Aug. 16, 2012 (Aug. 16, 2012). Retrieved from the Internet at URL:http://ieeexplore.ieee.orgixplilogin.jsp?tp=tarnumber=14387388turl=http%3A%2Fieeexplore.ieee.org%2Fxpls%2Fabs_all.jsp% Farnumber%3D1438738<http:login.jsp?tp="&amumber=1438738&url=http%3A%2F%Fiee"></http:>.

\* cited by examiner

APPARATUS AND METHODS FOR TEMPORAL PROXIMITY DETECTION

PRIORITY APPLICATIONS

This application is a continuation of and claims priority to co-owned U.S. patent application Ser. No. 14/191,383 entitled "Apparatus and Methods for Temporal Proximity Detection", filed Feb. 26, 2014, issuing as U.S. Pat. No. 9,373,038 on Jun. 21, 2016, which is incorporated herein by reference in its entirety.

CROSS-REFERENCE TO RELATED APPLICATIONS

This application is related to a co-pending and co-owned U.S. patent application Ser. No. 13/763,005 filed Feb. 8, 2013 and entitled "SPIKING NETWORK APPARATUS AND METHOD WITH BIMODAL SPIKE-TIMING DEPENDENT PLASTICITY", the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates computerized apparatus and methods for determining temporally persistent patterns in sensory input.

Description of Related Art

Object recognition in the context of computer vision relates to finding a given object in an image or a sequence of frames in a video segment. Typically, temporally proximate features that have high temporal correlations are identified within the sequence of frames, with successive frames containing temporally proximate representations of an object (persistent patterns). Object representations, also referred to as the "view", may change from frame to frame due to a variety of object transformations, such as rotation, movement, translation, change in lighting, background, noise, appearance of other objects, partial blocking and/or unblocking of the object, and/or other object transformations. Temporally proximate object representations occur when the frame rate of object capture is commensurate with the timescales of these transformations, so that at least a subset of a particular object representation appears in several consecutive frames. Temporal proximity of object representations allows a computer vision system to recognize and associate different views with the same object (for example, different phases of a rotating triangle are recognized and associated with the same triangle). Such temporal processing (also referred to as learning) may enable object detection and tracking based on an invariant system response with respect to commonly appearing transformations (e.g., rotation, scaling, translation, and/or other commonly appearing transformations).

Some existing approaches to binding or associating temporally proximate object features from different frames utilize artificial neuron networks (ANN). Accordingly, during operation such networks may not be able to accommodate changes of the temporally proximate features that were not present in the input during training.

SUMMARY

One aspect of the disclosure relates to a non-transitory computer-readable storage medium having instructions embodied thereon, the instructions being executable to perform a method of detecting a temporally persistent pattern in a sequence of image frames. The method may comprise encoding individual frames of the sequence of image frames into spike packets using a sparse transformation. The sparse transformation may be characterized by an information reduction parameter. The method may comprise determining a first spike within the spike packets. The first spike may be associated with a first representation of the pattern. The first spike may be characterized by a first time and a first ID. The method may comprise determining a second spike within the spike packets. The second spike may be associated with a second representation of the pattern. The second spike may be characterized by a second time and a second ID. The method may comprise determining a similarity matrix comprising a plurality of elements. Individual elements of the similarity matrix may be configured to be determined based on a comparison of the first ID and the second ID and a comparison of the first time and the second time. The method may comprise selecting a first vector from the similarity matrix. The first vector may be associated with the first ID. The method may comprise assigning the first vector to a category based on a distance measure from the first vector to one or more other vectors of the similarity matrix. Assignment of the first vector and one or more other vectors of the similarity matrix to the category may indicate the first representation being temporally proximate to the second representation.

Another aspect of the disclosure relates to a method of operating a computerized signal classification apparatus comprising network of nodes. The method may be performed by one or more processors configured to execute computer program instructions. The method may comprise using one or more processors to communicate a first version of a signal to an encoder portion of nodes of the network of nodes via a plurality of connections. The method may comprise using one or more processors to cause a first response by at least one node of the encoder portion based on the first version the signal. The method may comprise using one or more processors to update an efficacy of one or more connections of the plurality of connections. The method may comprise using one or more processors to determine a similarity measure based on the first response and a second response generated by a node of the encoder portion based on a second version the signal provided to nodes of the encoder node portion via the plurality of connections. The method may comprise using one or more processors to, based on the similarity measure, determine an input into a classifier portion of the network nodes of the network. The input may comprise a portion of the similarity measure corresponding to the at least one node. The method may comprise using one or more processors to cause an output generation by one and only one node of the classifier portion based on the input. The output may be indicative of a feature being present in the signal.

In some implementations, the input may be provided to nodes of the classifier portion via a second plurality of connections. The method may comprise evaluating efficacy of one or more connections of the second plurality of connections. The method may comprise communicating the signal to the one and only one node. The evaluation of the efficacy may be configured to increase a probability of another output generation by the one and only one node responsive to a presence of the feature in the signal subsequent to the output generation.

In some implementations, the first version of the signal and the second version of the signal both may comprise representations of the feature. The efficacy may comprise a connection weight configured to promote or demote response generation by the at least one node. Updating the efficacy may increase a probability of another response generation by the at least one node responsive to occurrence of another representation of the feature at a time subsequent to a time associated with the first version of the signal.

In some implementations, the signal may comprise a first frame and a second frame. The first frame and the second frame each may include digitized pixels generated by a sensing aperture of at least a sensor apparatus. The first frame may include a first representation of the feature transitioning across the sensing aperture. The second frame may include a second representation of the feature transitioning across the sensing aperture. The output may be generated responsive to an occurrence of the first representation being temporally proximate to the second representation.

In some implementations, the first representation of the feature and the second representation of the feature both may correspond to the feature undergoing a transformation. The transformation may include one or more of (i) a translational operation, (ii) a rotational operation, or (iii) a scaling operation. The sensing aperture of the sensor apparatus may comprise one or more of a radio frequency antennal, a sound transducer, an optical lens, or a light sensor.

In some implementations, the occurrence of the first representation being temporally proximate to the second representation may be determined based on the first representation occurring within a time window from the second representation. The first response may be provided responsive to an occurrence of the first representation. The second response may be provided responsive to an occurrence of the second representation. The similarity measure determination made responsive to the first response and the second response may occur within the time window.

In some implementations, the time window may have a duration between 0.1 milliseconds to 10 seconds, inclusive.

In some implementations, the first response may be generated responsive to the first frame comprising the first representation of the feature. The second response may be generated responsive to the second frame comprising the second representation of the feature. The similarity measure determination may be made based on a comparison of a time interval between an occurrence of the first response and an occurrence of the second response.

In some implementations, the similarity measure determination made responsive to the first response and the second response may occur within a time window. The second version temporally precedes the first version.

In some implementations, the first version of the signal and the second version of the signal both may comprise a plurality of sensory frames. The first version may be determined based on a first representation of the feature at a first time. The second version may be determined based on a second representation of the feature at a second time. The similarity measure may comprise a plurality of indexed vectors. Individual vectors of the plurality of indexed vectors may be determined based occurrence of one or more responses corresponding to one or more individual ones of the plurality of encoded frames. The one or more responses may comprise the first response and the second response. The portion of the similarity measure may comprise a vector of the plurality of indexed vectors. The vector may correspond to the at least one node generating the response. The output generation may be determined based on a distance measure between the vector and one or more individual ones of the plurality of indexed vectors.

In some implementations, the similarity measure may comprise a matrix. Individual ones of the plurality of indexed vectors may comprise a column or a row of the matrix. For an inter-frame interval, the time interval between the first time and the second time may be selected between one inter-frame interval and 250 inter-frame intervals.

In some implementations, the distance measure may be determined based on a distance determination operation may include one or more of Euclidean distance, radial distance, or rectilinear distance.

In some implementations, the encoder portion of the network may comprise a first number of nodes configured to effectuate a sparse transformation of individual ones of the plurality of sensory frames into a plurality of encoded frames. The first number of nodes of the encoder portion may be configured to generate a response associated with the plurality of encoded frames. The sparse transformation may be characterized by a second number of nodes responding to a given sensory frame of the plurality of sensory frames being smaller than the first number of nodes.

In some implementations, the first version of the signal and the second version of the signal both may comprise a plurality of sensory frames. The first version may be determined based on a first representation of the feature at a first time. The second version may be determined based on a second representation of the feature at a second time. The similarity measure may comprise a matrix of elements. Individual elements of the matrix may be determined responsive to occurrence of one or more responses corresponding to one or more individual ones of the plurality of encoded frames. The one or more responses may comprise the first response and the second response. The matrix may be characterized by one or more eigenvectors associated with one or more nodes of the encoder portion. The portion of the similarity measure may comprise an eigenvector vector of the matrix. The eigenvector may correspond to the at least one node generating the response. The output generation may be determined based on a distance measure between the eigenvector and one or more individual ones of the one or more eigenvectors.

In some implementations, the signal may comprise a first frame having digitized pixels corresponding to the first version of the signal and a second frame having digitized pixels corresponding to the second version of the signal. The first frame may comprise a first representation of the feature at a first time. The second frame may comprise a second representation of the feature at a second time. The at least one node may comprise a first artificial spiking neuron and a second artificial spiking neuron. The first artificial spiking neuron may be characterized by a first receptive area of the first frame. The second artificial spiking neuron may be characterized by a second receptive area of the second frame. The first response may comprise a first spike communicated by the first artificial spiking neuron based on an evaluation of one or more pixels within the first area of the first frame. The second response may comprise a second spike communicated by the second artificial spiking neuron based on an evaluation of one or more pixels within the second area of the second frame.

In some implementations, the first frame and the second frame may be provided based on output of one or more of a visible light sensor, an audio sensor, a pressure sensor, or a radar device.

In some implementations, the first frame and the second frames may be separated by an interframe time interval. The second frame may temporally precede or temporally succeed the first frame. The first frame and the second frame may comprise two representations of the feature that are separated at least by the interframe time interval from one another.

Yet another aspect of the disclosure relates to a computerized apparatus configured to detect a first temporally persistent pattern and a second temporally persistent pattern in data stream input data comprising a plurality of packets. The apparatus may comprise one or more processors configured to execute computer program instructions. The computer program instructions may comprise an encoder component configured, when executed, to transform individual ones of the plurality of packets into a plurality of encoded packets using a sparse transform. The computer program instructions may comprise a similarity component configured, when executed, to determine a similarity matrix based on a comparison between a current encoded packet and one other of the plurality of encoded packets. The current encoded packet may be configured based on the first pattern. The one other the current encoded packet may be configured based on the second pattern. The computer program instructions may comprise a classifier component configured, when executed, to assign one or more portions of a similarity map into one of a first category or a second category. Assignment of a first portion and a second portion of the one or more portions of the similarity map into the first category may be configured to indicate a temporal persistence between the first pattern and the second pattern. The first portion of the one or more portions of the similarity map may correspond to the current encoded packet. The second portion of the one or more portions of the similarity map may correspond to the one other encoded packet. The assignment may be configured based on a distance measure between the first portion and individual ones of the one or more portions.

In some implementations, the one other packet may comprise a preceding or a subsequent packet relative the current encoded packet. Individual ones of the plurality of packets may occur at inter-packet intervals. The current encoded packet may comprise a response to the first pattern provided by the encoder component. The one other encoded packet may comprise a response to the second pattern provided by the encoder component. The one other encoded packet may occur within 200 intervals from the current encoded packet.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
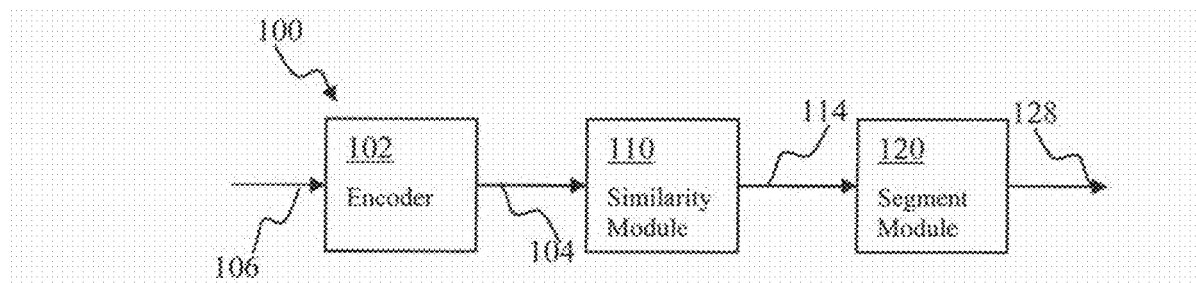
FIG. 1 is a functional block diagram depicting a processing apparatus useful for detecting temporally consistent objects in sensory input, according to one or more implementations.

All Figures disclosed herein are © Copyright 2014 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, 0, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides apparatus and methods for detecting consistent (e.g., temporally proximate) patterns and/or features, according to various implementations. In some implementations, the detection methodology of temporally persistent patterns of the disclosure may be applied to processing of sensory data, e.g., an audio signal, a stream of video frames (such as described with respect to FIG. 1 below) and/or other sensory input. In one or more implementations, the detection methodology may be utilized in order to detect temporally persistent patterns in motor feedback and/or motor command generation. In one or more implementations, the detection methodology may be utilized in order to detect temporally persistent patterns in linguistic data: spoken words and/or written passages. By way of an illustration, the detection methodology may be applied in detecting object motion based on processing of data comprising two or more channels of audio data. Upon detecting temporally proximate patterns in individual audio channels, the temporal proximity structure of the identified patterns may be analyzed in order to extract an underlying motion of the object (e.g., vehicle engine) that may cause the patterns in the audio signal.

FIG. 1 is a functional block diagram depicting a processing apparatus useful for detecting temporally consistent objects in sensory input, according to one or more implementations.

The apparatus 100 may receive input 106. The input 106 may comprise one or more frames received from an image sensor (e.g., charge-coupled device (CCD), CMOS device, and/or an active-pixel sensor (APS), photodiode arrays, and/or other image sensors). In one or more implementations, the input may comprise a pixel stream downloaded from a file. An example of such a file may include a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) are equally applicable to and useful with the various aspects of the present disclosure. Furthermore, data frames corresponding to other (non-visual) signal modalities such as sonograms, IR, radar or tomography images are equally compatible with the processing methodology of the disclosure, or yet other configurations.

The input 106 may be processed by an encoder module 102. The module 102 may comprise an artificial neuron network (ANN) comprising a plurality of nodes. Individual nodes of the module 102 network may comprise neuron units characterized by a receptive field, e.g., region of space in which a presence of a stimulus may affect response of the neuron. In some implementations, the units may comprise spiking neurons and the ANN may comprise a spiking neuron network, (SNN). Various implementations of SNN may be utilized with the disclosure, such as, for example, those described in co-owned, and co-pending U.S. patent application Ser. No. 13/774,934, entitled "APPARATUS AND METHODS FOR RATE-MODULATED PLASTICITY IN A SPIKING NEURON NETWORK" filed Feb. 22, 2013, Ser. No. 13/763,005, entitled "SPIKING NETWORK APPARATUS AND METHOD WITH BIMODAL SPIKE-TIMING DEPENDENT PLASTICITY" filed Feb. 8, 2013, Ser. No. 13/152,105, filed Jun. 2, 2011 and entitled "APPARATUS AND METHODS FOR TEMPORALLY PROXIMATE OBJECT RECOGNITION", Ser. No. 13/487,533, filed Jun. 4, 2012 and entitled "SYSTEMS AND APPARATUS FOR IMPLEMENTING TASK-SPECIFIC LEARNING USING SPIKING NEURONS", Ser. No. 14/020,376, filed Sep. 9, 2013 and entitled "APPARATUS AND METHODS FOR EVENT-BASED PLASTICITY IN SPIKING NEURON NETWORKS", Ser. No. 13/548,071, filed Jul. 12, 2012 and entitled "SPIKING NEURON NETWORK SENSORY PROCESSING APPARATUS AND METHODS", commonly owned U.S. patent application Ser. No. 13/152,119, filed Jun. 2, 2011, entitled "SENSORY INPUT PROCESSING APPARATUS AND METHODS", Ser. No. 13/540,429, filed Jun. 2, 2012 and entitled "SENSORY PROCESSING APPARATUS AND METHODS", Ser. No. 13/623,820, filed Sep. 20, 2012 and entitled "APPARATUS AND METHODS FOR ENCODING OF SENSORY DATA USING ARTIFICIAL SPIKING NEURONS", Ser. No. 13/623,838, filed Sep. 20, 2012 and entitled "SPIKING NEURON NETWORK APPARATUS AND METHODS FOR ENCODING OF SENSORY DATA", Ser. No. 12/869,573, filed Aug. 26, 2010 and entitled "SYSTEMS AND METHODS FOR INVARIANT PULSE LATENCY CODING", Ser. No. 12/869,583, filed Aug. 26, 2010, entitled "INVARIANT PULSE LATENCY CODING SYSTEMS AND METHODS", Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", Ser. No. 13/152,084, filed Jun. 2, 2011, entitled "APPARATUS AND METHODS FOR PULSE-CODE INVARIANT OBJECT RECOGNITION", Ser. No. 13/239,255 filed Sep. 21, 2011, entitled "APPARATUS AND METHODS FOR SYNAPTIC UPDATE IN A PULSE-CODED NETWORK", Ser. No. 13/487,576 entitled "DYNAMICALLY RECONFIGURABLE STOCHASTIC LEARNING APPARATUS AND METHODS", filed Jun. 4, 2012, and U.S. Pat. No. 8,315,305, entitled "SYSTEMS AND METHODS FOR INVARIANT PULSE LATENCY CODING" issued Nov. 20, 2012, each of the foregoing being incorporated herein by reference in its entirety.

Receptive fields of the network 102 units may be configured to span several pixels with the input 106 frames so as to effectuate sparse transformation of the input 106 into the output 104. Various applicable methodologies may be utilized in order to effectuate the sparse transformation, including, for example, those described in co-pending and co-owned U.S. patent application Ser. No. 13/540,429, entitled "SENSORY PROCESSING APPARATUS AND METHODS", filed Jul. 2, 2012, and U.S. patent application Ser. No. 13/623,820, entitled "APPARATUS AND METHODS FOR ENCODING OF SENSORY DATA USING ARTIFICIAL SPIKING NEURONS", filed on Sep. 20 2012, each of the foregoing being incorporated herein by reference in its entirety. By way of a non-limiting illustration, a unit whose receptive field area may cover between 1 and N pixels in the frame of the input 106 may generate an output (e.g., a spike) responsive to one or more pixels having value distinct from background. The sparse output v may be expressed as follows:

$$v = Y(x) \quad \text{(Eqn. 1)}$$

where x denotes the input (e.g., a digitized frame), and Y denotes the sparse transformation. In one or more implementations, for an input x of dimension n and output y of dimension m, the sparse factor $M=n/m$ of the transformation Y may be selected between n (e.g., a single encoder 102 unit response to a frame) and m/5 (20% of encoder 102 units respond to input frame). In some implementations of ANN (e.g., such as shown and described with respect to FIG. 10B), the sparse transformation may comprise coupling n-inputs 1032 to m neurons 1036_1, 1036_m via connections 1040. Connections 1040 may be characterized by an array of weights (n×m). Individual weight components of the array may be adjusted during learning based on adding the input vector to the weights scaled by a small learning rate for the weights corresponding to the small number of neurons that were active for a given input, e.g., using Eqn. 11, Eqn. 12. Further, learned weights may be made more independent by employing Matching-Pursuit or similar methods which orthogonalize the input being learned.

In some implementations, the input orthogonalization may be described as follows. When an i-th unit responds to a given feature (e.g., a vertical bar) within an input I, the input I may be modified as follows:

$$I'=I-(I \cdot w_i) \cdot w_i, \qquad \text{(Eqn. 2)}$$

so that $$I' \cdot w_i = 0. \qquad \text{(Eqn. 3)}$$

In Eqn. 2-Eqn. 3 $w_i$ denotes a vector of efficacies associated with the i-th unit; I denotes the initial input that may cause the i-th unit to respond; and I' denotes residual input ortogonalized with respect to the given feature. In some implementations, the residual input I' may be used for training one or more remaining units of the encoder network to respond to one or more features that may be present in the residual input.

In some implementations of encoding frames of pixels using ANN, the encoder network may comprise between 2 and 10×N units, wherein N is the number of pixels per frame. The output of such network may be referred to as sparse based on a subset (e.g., between 1 and 2×N units) of the encoder units being active for a given frame.

It will be appreciated by those skilled in the arts that while the above encode example describes encoding frames of pixels, other data may be encoded using methodology described herein. In one or more implementations, the space encoding may be applied to time series, sample distributions of observations, motor signals in a robotic apparatus, word patterns in text, and/or other data. The receptive fields of the encoder unit may be configured in accordance with requirements of a specific application. In one or more implementation, the receptive fields may comprise a Gaussian distribution, an elliptic distribution, a linear distribution, difference of Gaussians distribution, a sigmoid distribution, and/or other distributions. In some implementations, the receptive field configuration may be learned during training.

It will be appreciated by those skilled in the arts that the sparse transformation may be implemented using a variety of approaches. In some implementations a thresholding mechanism (e.g., wherein encoder units may be activated based on input pixel value exceeding a fixed or varying threshold); sparse coding techniques, spatial averaging (subsampling), and/or other applicable methods may be utilized in order to achieve sparse transformation.

The sparse output v 104 may be provided to module 110. The module 110 may be configured to determine a similarity matrix S based on the sparse signal v. The signal v 106 may comprise activity of one or more units of the module 102 network. In one or more implementations, the similarity matrix may be configured based on a comparison of activity of i-th unit at time t $v^i(t)$, to activity of the j-th unit at a prior time t-dt: $v_j(t-dt)$. The time interval dt may correspond to inter-frame interval (selected, e.g., between 0.1 ms and 10000 ms) associated with the input 106.

Figure 4:
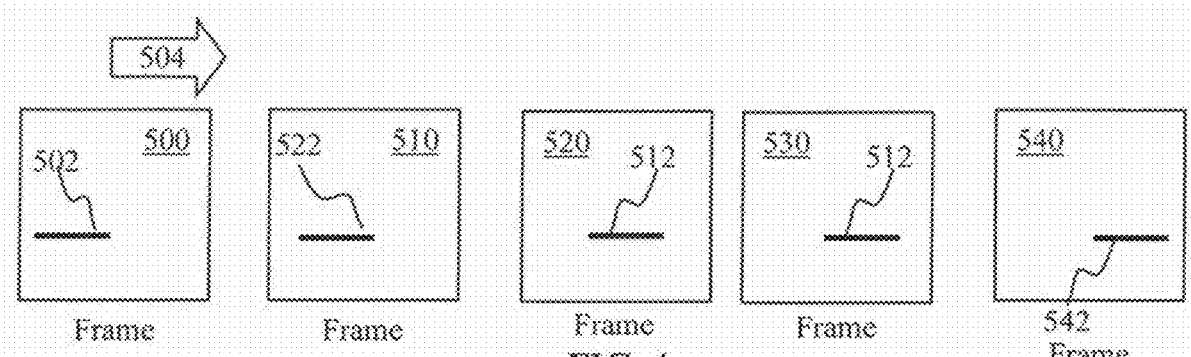
FIG. 4 is a graphical illustration depicting input frames into an encoder of the proximity detector, the input comprising representations of a horizontal object moving horizontally across view field, according to one or more implementations.
Figure 5:
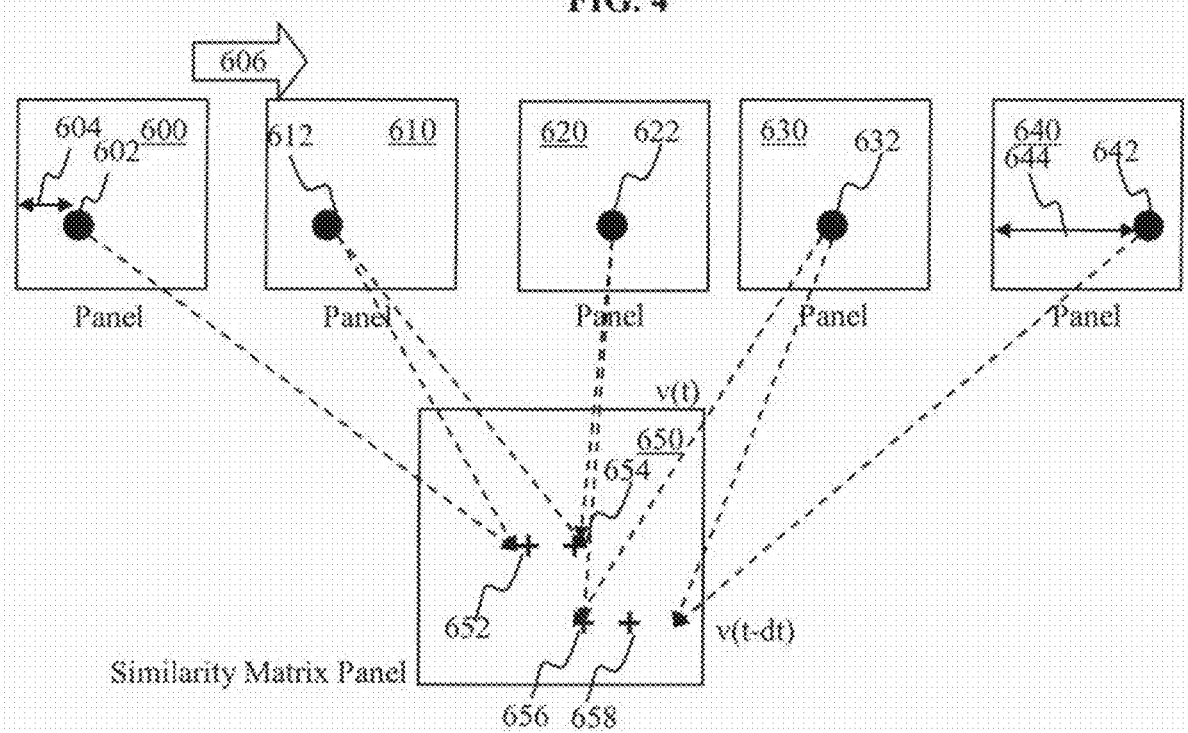
FIG. 5 is a graphical illustration depicting output of the encoder and the corresponding similarity matrix determined based on the input of FIG. 4, according to one or more implementations.

When the i-th unit is active at time t and j-th unit is active at time t-dt, the similarity matrix i-th, j-th component may be incremented as follows with two variants of the same form:

$$S^{i,j}(t)=S^{i,j}(t-dt)+l, \text{ when } \alpha(v^i(t)) \& \alpha(v^j(t-dt)) \qquad \text{(Eqn. 4)}$$

$$S^{i,j}(t)=S^{i,j}(t-dt)+l, \text{ when } \{\alpha(v^i(t)) \text{AND } \alpha(v^j(t-dt))\} \text{AOR} \{\alpha(v^j(t)) \text{AND } \alpha(v^i(t-dt))\} \qquad \text{(Eqn. 5)}$$

where l is an increment rate (e.g., selected equal one in the implementation illustrated in FIGS. 4-5), and function $\alpha(x)$ denotes units that are active. In one or more implementations, the function $\alpha(x)$ may be configured of the form $x \neq 0$, $|x|>t$, where t is a threshold, and/or other forms. In some implementations, the formulation of Eqn. 4 may produce an asymmetric similarity matrix output. The formulation of Eqn. 5 may produce a symmetric similarity matrix output.

In one or more implementations, comparison operations associated with determination of the similarity measure (e.g., the matrix S of Eqn. 4-Eqn. 5) may comprise evaluation of activity status (e.g., response generated or not) of one or more units at time t with activity status of one or more units at time t−Δt, and/or t+Δt. In some implementations wherein the encoder units may be arranged into a two dimensional pattern (e.g., as in panels 300, 310, 320, 330, 340) the units may be referred to by column/row index. In one or more the units may be referred to by unit ID. The unit ID may comprise a serial number, a tag (as described for example in U.S. patent application Ser. No. 13/385,938, entitled "TAG-BASED APPARATUS AND METHODS FOR NEURAL NETWORKS", filed Mar. 15, 2012, incorporated herein by reference in its entirety) a unit type, a geographical coordinate, and/or other information.

In some implementations wherein a number of inactive units exceed a number of active units, the unit activity function $\alpha$ may correspond to unit generating a response (e.g., a spike in SNN implementations). In one or more implementations wherein number of active units exceeds number inactive units, the unit activity function $\alpha$ may correspond to absence of response by the unit (e.g., pause as described in U.S. patent application Ser. No. 13/761,090, entitled "APPARATUS AND METHODS FOR GATING ANALOG AND SPIKING SIGNALS IN ARTIFICIAL NEURAL NETWORKS", filed Feb. 6, 2013, the foregoing being incorporated herein by reference in its entirety).

The similarity matrix S output 114 of the module 110 may be provided to module 120. The module 120 may be configured to segment the similarity matrix S into two or more partitions containing representations of one or more features and or objects exhibiting a sufficient degree of similarity. In some implementations, objects characterized by a high degree of similarity may be merged into a given partition; the degree of sufficiency for being merged into the same partition may be determined based on parameters such as, e.g., the number of partitions, nature of similarities between objects, and/or other parameters. For example, for two partitions and 4 objects, two most similar objects may be partitioned together into first partition. The remaining two objects may be placed into the remaining (second) partition regardless of their similarity. Various segmentation methodologies may be applied to obtain partitions, such as, for example, self-organized mapping (SOM), k-means clustering, spectral clustering, principal component analysis, and/or other methodologies. In some implementations of spectral clustering, a spectrum (e.g., eigenvalues) of the similarity matrix may be determined in order to reduce dimensionality of the similarity data prior to clustering.

One spectral clustering technique is the normalized cuts algorithm or Shi-Malik, commonly used for image segmentation. In accordance with some implementations, the similarity matrix may be partitioned into two sets (s1,s2) based on the eigenvector e corresponding to the second-smallest eigenvalue of the normalized Laplacian matrix of S $$L = I - D^{-\frac{1}{2}} S D^{-\frac{1}{2}}.$$ (Eqn. 6)

where D is the diagonal matrix $$D_{ii} = \Sigma_j S_{ij}.$$ (Eqn. 7)

Partitioning of the matrix L of Eqn. 6 may be performed using a variety of approaches. In some implementations, partitioning may be based on determining the median MD of the eigenvalue components, and placing points whose component is greater than the median into cluster s1. The remaining components may be assigned to the cluster s2. Such clustering algorithm may be used for hierarchical clustering by repeatedly partitioning the subsets.

In one or more implementations of SOM segmentation, the output 114 of the module 110 (the matrix S) may be multiplied by output of the first compression stage (e.g., the output v 104 of the sparse transform) as follows:

$$u = v \times S.$$ (Eqn. 8)

When a single unit of the encoder (e.g., unit j) is active the signal v may comprise one non-zero term so that output u of the Eqn. 8 comprises a vector selected as a j-th row/column of the similarity matrix corresponding to the active unit. When multiple units of the encoder (e.g., units j, k, l) are active, the signal v may comprise multiple non-zero elements so that output u of the Eqn. 8 may be determined as a combination of multiple vectors selected as j,k,l-th rows/columns from the similarity matrix. The output u of the Eqn. 8 may be used to perform clustering (partitioning) operation based on a similarity measure.

The similarity may be interpreted as follows ways. In some implementations, elements of the vector u may be considered as the measure of similarity of the current response v to output of units of the sparse transform, since the length of vector u is the same as the number of output units of the sparse transform. In one or more implementations, the similarity between two inputs may be determined by computing their respective output u vectors from Eqn. 3, u1 and u2, and computing a distance measure D between u1 and u2. The smaller the distance D, the more similar are the inputs. The larger the distance D the less similar are the inputs. In one or more implementations, the distance measure may comprise Euclidean distance, cosine of the angle between vectors u1 and u2, rectilinear distance, and/or other measures. As the new inputs 106 become available, the signals v (104), S (114) are updated and the segmentation output is iteratively updated online utilizing new available data. Applying a second SOM to perform segmentation utilizes properties of the distance-based similarity determination. During SOM operations input patterns with the smallest distances to one another (e.g., as shown and described below with respect to FIG. 6) may be mapped together into the same output unit.

Figure 12:
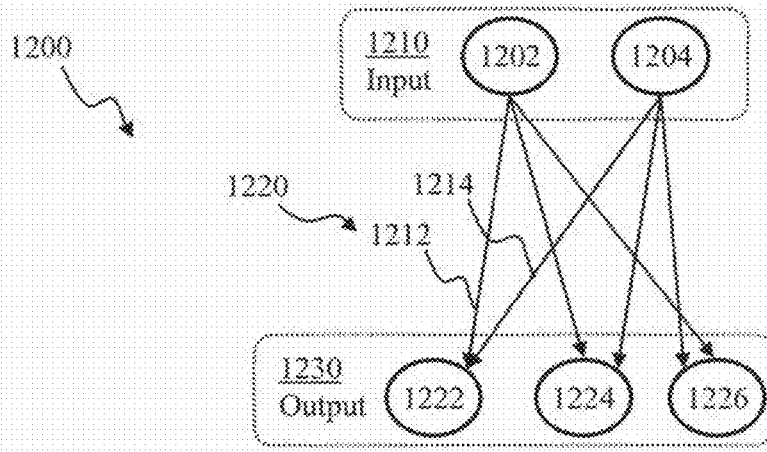
FIG. 12 is a block diagram illustrating an artificial neuron network useful for implementing SOM-based input processing, in accordance with one or more implementations.

In some implementations, SOM operations may be effectuated via adaptation of efficacies of connections within an ANN, e.g., as shown and described in FIG. 12. Connection efficacy in general may refer to a magnitude and/or probability of input into a unit influencing unit response (i.e., output spike generation/firing in a spiking neuron network). The connection efficacy may comprise, for example a parameter (e.g., synaptic weight) by which one or more state variables of the unit may be changed. In one or more implementations, the efficacy may comprise a latency parameter characterizing spike propagation delay from a pre-synaptic neuron to a post-synaptic neuron. In some implementations, greater efficacy may correspond to a shorter latency.

The network 1200 of FIG. 12 may comprise an input layer 1210 (comprised of units 1202, 1204) and output layer 1230 (comprised of units 1222, 1224, 1226). In some SOM implementations of sparse transformation (e.g., effectuated by module 102 of FIG. 1) the input signal of the layer 1210 of FIG. 12 may comprise the sensory signal 106 of FIG. 1. In one or more SOM implementations of clustering (e.g., effectuated by module 120 of FIG. 1) the input data of the layer 1210 of FIG. 12 may comprise the similarity matrix (e.g., 114 of FIG. 1).

Units of the input layer may be connected to units of the output layer via connections 1220 using, e.g., all-to-all connectivity mapping. For a given layer 1230 unit (e.g., 1222) weights of the incoming connections (e.g., 1212, 1214) may be adapted as follows. For a given input vector x={x1, ... xn} provided by the input layer 1210 to i-th unit of the output layer, a distance measure may be computed:

$$D_i = \mathcal{H}(x - w^i)$$ (Eqn. 9)

where $w^i$ is the efficacy vector of connections providing the input x to the i-th unit, e.g., when the i-th unit comprises the unit 1222, the efficacy vector $w^i$ comprises efficacy w1 of the connection 1212 and efficacy w2 of the connection 1214 of the network 1200. In one or more implementations, the operation $\mathcal{H}$ may be based on Euclidean distance, cosine of the angle between the vectors x and $w^i$, rectilinear distance, and/or other measures. Using the formulation of Eqn. 9, a distance vector D{D1, ... Dm} containing distances associated with individual units of the output layer 1230 may be determined.

Based on occurrence of the input provided by the layer 1210 one or more units of the output layer 1230 may respond. The responding units may be determined based using the distance measure of Eqn. 9. In some implementations wherein a single unit of the layer 1230 may respond, the responding unit (e.g., k-th) may correspond to a unit having a minimum distance Dk associated therewith, for example:

$$D_k = \min(D)$$ (Eqn. 10)

In one or more implementations wherein a two or more units of the layer 1230 may respond, the responding units (e.g., k1, k2) may correspond to units having a smallest distance Dk associated therewith.

Efficacy of connections 1220 providing input to one or more responding units of the layer 1230 may be updated. In some implementations, connection efficacy may be updated as follows:

$$w_k^i(t + \Delta t) = w_k^i(t) + \gamma x$$ (Eqn. 11)

where $\gamma$ is the learning rate, x is the input, $w_k^i(t)$, $w_k^i(t+\Delta t)$ are the initial and the updated efficacies, respectively, of i-th connection into k-th unit. In one or more implementations, connection efficacy update may be implemented as follows $$w_k^i(t + \Delta t) = (1 - \gamma) w_k^i(t) + \gamma x.$$ (Eqn. 12)

The input x and/or the efficacy w may be scaled (normalized) to fall within a given interval (e.g., 0-1).

These segments, found by the segmenting algorithm, often are associated with unique types of objects but agnostic to certain types of transformations, such as one segment may correspond to all vertical lines but agnostic to their location. Similarly another segment may correspond to all horizontal lines regardless of their location within the visual field. Yet another segment may correspond to diagonal-up lines and another to diagonal-down lines, and/or other input.

FIGS. 2-7 illustrate determination of temporally proximate features in sensory input using the methodology of the present disclosure. In one or more implementations, the temporal proximity detection may be performed by the apparatus 100 described above with respect to FIG. 1.

Figure 2:
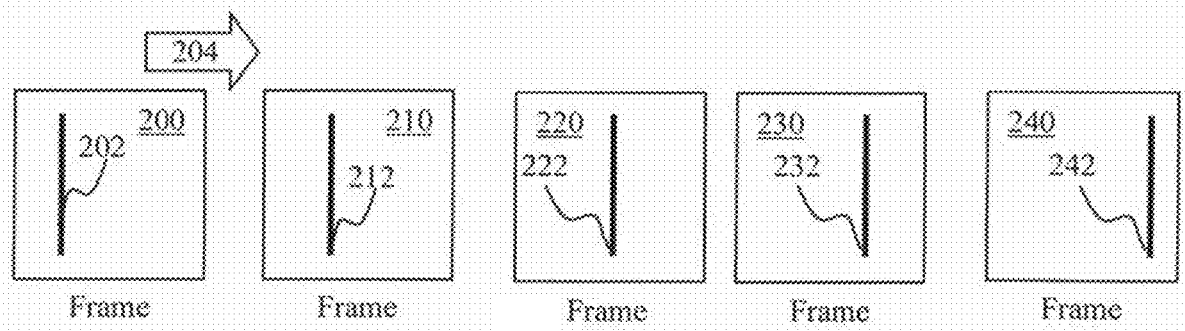
FIG. 2 is a graphical illustration depicting input frames into an encoder of the proximity detector, the input comprising representations of a vertical object moving horizontally across view field, according to one or more implementations.

FIGS. 2, 4 depict input into an encoder of the proximity detector. The input of FIG. 2 comprises a plurality of frames 200, 210, 220, 230, 240 containing representations 202, 212, 222, 232, 242 of a vertical object moving horizontally in a direction 204 across view field. The input of FIG. 4 comprises a plurality of frames 500, 510, 520, 530, 540 containing representations 502, 512, 522, 532, 542 of a horizontal object moving horizontally in a direction 504 across view field. In one or more implementations, the frames 200, 210, 220, 230, 240 of FIG. 2 and/or the frames 500, 510, 520, 530, 540 of FIG. 5 may be provided by an image sensor (such as a charge-coupled device (CCD), CMOS device, and/or an active-pixel sensor (APS), photodiode arrays, etc.). In some implementations, the input may comprise a pixel stream downloaded from a file, such as a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, etc.) are equally applicable to and useful with the various aspects of the present disclosure. Furthermore, data frames corresponding to other (non-visual) signal modalities such as sonograms, IR, radar or tomography images are equally compatible with the processing methodology of the disclosure, or yet other configurations, according to one or more implementations.

The input shown FIGS. 2, 4 may be processed by an encoder (e.g., the module 102 in FIG. 1). The encoder may comprise an artificial neuron network (ANN) comprising a plurality of units. The encoder may implement a sparse transformation wherein a subset of the network units may respond to the input stimuli.

Figure 3:
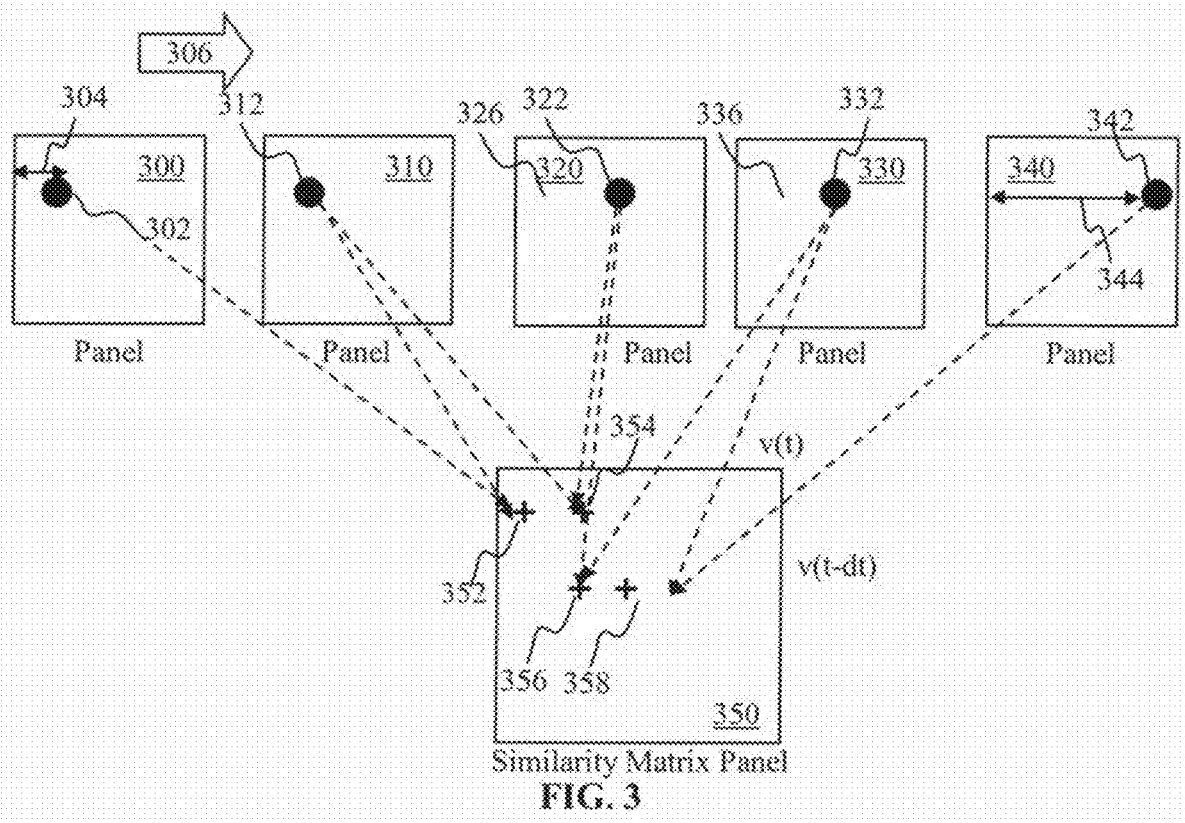
FIG. 3 is a graphical illustration depicting output of the encoder and the corresponding similarity matrix determined based on the input of FIG. 2, according to one or more implementations.

FIGS. 3 and 5 depict exemplary output of a neuron network encoder (e.g., the output 104 of the encoder 102 in FIG. 1) determined based on one or more input frames (e.g., shown in FIGS. 2, 4, respectively). The data shown in FIGS. 3, 5 are obtained with encoder configuration implementing maximum sparsity, wherein a single network unit may generate a response to the input. It will be appreciated by those skilled in the arts that other sparsity configurations may be employed in accordance with specifications of a target task.

The output of FIG. 3 comprises a plurality of panels 300, 310, 320, 330, 340 wherein individual frames contain a single output (maximum sparsity) denoted by solid circles 302, 312, 322, 332, 342. Data shown in frames 200, 210, 220, 230, 240 may correspond to encoder output 104 corresponding to the feature (e.g., bar) entering sensing area (e.g., aperture) of a sensor providing the input 106. Due to the sparse encoding (e.g., of Eqn. 4) implemented by the encoder 102, the encoded signal of, e.g., the panel 300 in FIG. 3, may comprise output 302. As the feature in FIG. 2 progresses rightward along the motion direction 204, different encoding neurons may be activated as shown by solid circles 302, 312, 322, 332, 342 in panels 300, 310, 320, 330, 340. As the feature moves across the sampling extent, one or more neurons that were active in one panel, may become inactive in one or more subsequent panel (e.g., as depicted by absence of solid circle at location at the location 326 in panel 320 in FIG. 3). In FIG. 3, the outputs 302, 312 correspond to the encoder unit in position p1, outputs 322, 332 correspond to the encoder unit in position p2, and the output 342 corresponds to the encoder unit in position p3.

Horizontal positions of the responses 302, 312, 322, 332, 342 may gradually progress rightward in direction shown by arrow 306 that corresponds to the object motion direction 204 in FIG. 2. Accordingly by way of an example, a distance 344 between left edge of the frame 340 and the response 342 is greater when compared to a distance 304 between left edge of the frame 300 and the response 302 in FIG. 3.

Figures 6, 7:
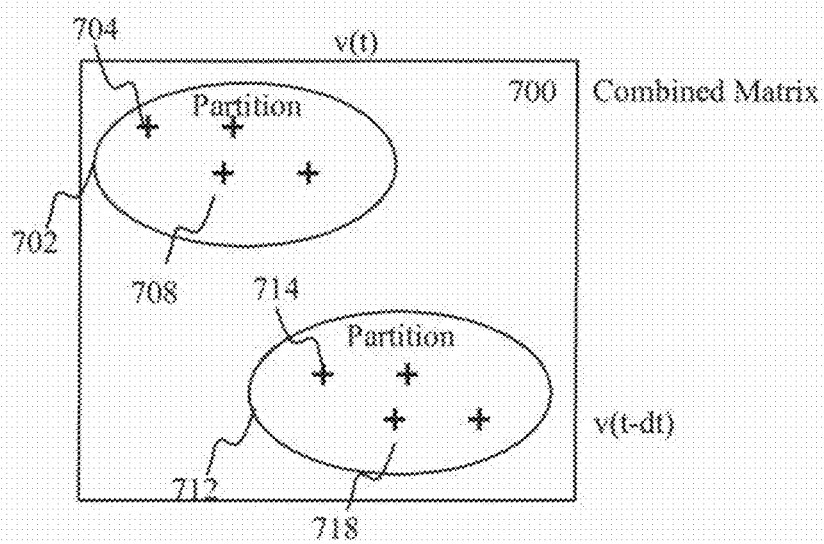
FIG. 6 is a diagram depicting inter-element distance used in SOM segmentation, according to one or more implementations.
FIG. 7 is a graphical illustration depicting output of segmentation operation corresponding to the similarity matrix data shown in FIG. 3 and FIG. 5, according to one or more implementations.

The output of FIG. 5 comprises a plurality of frames 600, 610, 620, 630, 640 wherein individual frames contain a single output (maximum sparsity) denoted by solid circles 602, 612, 622, 632, 642. Horizontal positions of the responses 602, 612, 622, 632, 642 may gradually progress in direction shown by arrow 606 that corresponds to the rightward object motion direction 606 in FIG. 5. Accordingly by way of an example, a distance 644 between left edge of the frame 640 and the response 642 is greater when compared to a distance 604 between left edge of the frame 600 and the response 602 in FIG. 5. In FIG. 6, the outputs 602, 612 correspond to the encoder unit in position p4, outputs 622, 632 correspond to the encoder unit in position p5, and the output 642 corresponds to the encoder unit in position p6.

Panel 350 in FIG. 3 and panel 650 in FIG. 5 depict similarity matrices corresponding to input of FIGS. 2, 4, respectively. The similarity matrix of FIG. 3 and FIG. 5 may be determined based on Eqn. 4, wherein matrix element at a location i,j is incremented when unit j is active at a prior instance (e.g., the prior frame) and unit i is active on the current frame. Increments are shown by symbol '+' in panels 350, 630 of FIGS. 3, 5, wherein multiple symbols correspond to multiple increments.

Broken line arrows are used to relate a given increment '+' in panel 350 to relevant unit output activity in panels 300, 310, 320, 330, 340; and increment in panel 650 to relevant unit output activity in panels 600, 610, 620, 630, 640. Specifically, the increment 352 may be based on output activity 302, 312 in panels 300, 310, respectively; the increment 354 may be based on output activity 312, 322 in panels 310, 320, respectively; the increment 356 may be based on output activity 322, 332 in panels 320, 330, respectively the increment 358 may be based on output activity 332, 342 in panels 330, 340, respectively. In FIG. 5, the increment 652 may be based on output activity 602, 612 in panels 600, 610, respectively; the increment 654 may be based on output activity 612, 622 in panels 610, 620, respectively; the increment 656 may be based on output activity 622, 632 in panels 620, 630, respectively the increment 658 may be based on output activity 632, 642 in panels 630, 640, respectively.

FIG. 6 presents an exemplary distance measure that may be used in the SOM-based segmentation of similarity matrices (e.g., 350, 650). The distance matrix 400 of FIG. 6 may represent the Euclidean distance between individual elements of similarity matrix (e.g., elements 352, 354 of matrix 3560 in FIG. 3). In some implementations, the cosine of the angle between vectors u1 and u2, and/or other measures may be used for distance determination. When performing the in SOM-based segmentation of a plurality of elements (e.g., the elements denoted '+' in FIGS. 3, 5), for a given element, the distance to one or more remaining elements may be evaluated. The given element and an element corresponding to the smallest distance to the given element may be assigned the same cluster. By way of an illustration shown in FIG. 6, elements 402, 404 may be assigned to one cluster, as the distances to one another are the closest (e.g., 0.1). Elements 412, 414 may be assigned to another cluster, as the distances to one another are the closest (e.g., 0.2). It is noteworthy, that in some implementations (e.g., shown and described with respect to FIGS. 6-7) a difference in distance, rather than an absolute value of distance, may be used in assigning elements to clusters using the SOM procedure.

The similarity matrices (e.g., 350, 650 in FIG. 3, 5) may be utilized for determining presence of one or more features in input (e.g., 106 in FIG. 1). Output 114 of the module 110 of FIG. 1 may comprise similarity matrix data that are provided to the module 120. The module 120 of FIG. 1 may segment the similarity matrix S into one or more partitions containing representations of one or more features and or objects grouping together the objects most similar to one another.

FIG. 7 depicts output of the SOM-based segmentation process applied to the similarity matrix data shown and described above with respect to FIGS. 3, 5. In one or more implementations, the matrix 700 of FIG. 7 may be obtained based on a combination (e.g., a sum) of matrices 350, 650. In some implementations wherein the classification output may comprise two classes, the segmentation methodology may comprise determination of a distance measure between two given elements, e.g., as described above with respect to FIG. 6. Individual elements (e.g., the elements 704, 708, 714, 718 denoted by symbol '+') of the matrix 700 may be segmented into one or two groups. As shown in FIG. 7, the elements 704, 708 are assigned to group 702; the elements 714, 718 are assigned to group 712. The partitions 702, 712 may correspond to vertical and horizontal features in the input shown in FIGS. 2, 5. In some implementations, a given elements within a given portion (e.g., the element 704 of the portion 702) may be characterized by a positive similarity to another elements within that portion (e.g., the element 708 of the portion 702) and zero similarity to elements of the other portion (e.g., the elements 714, 718 of the portion 712).

Figure 8:
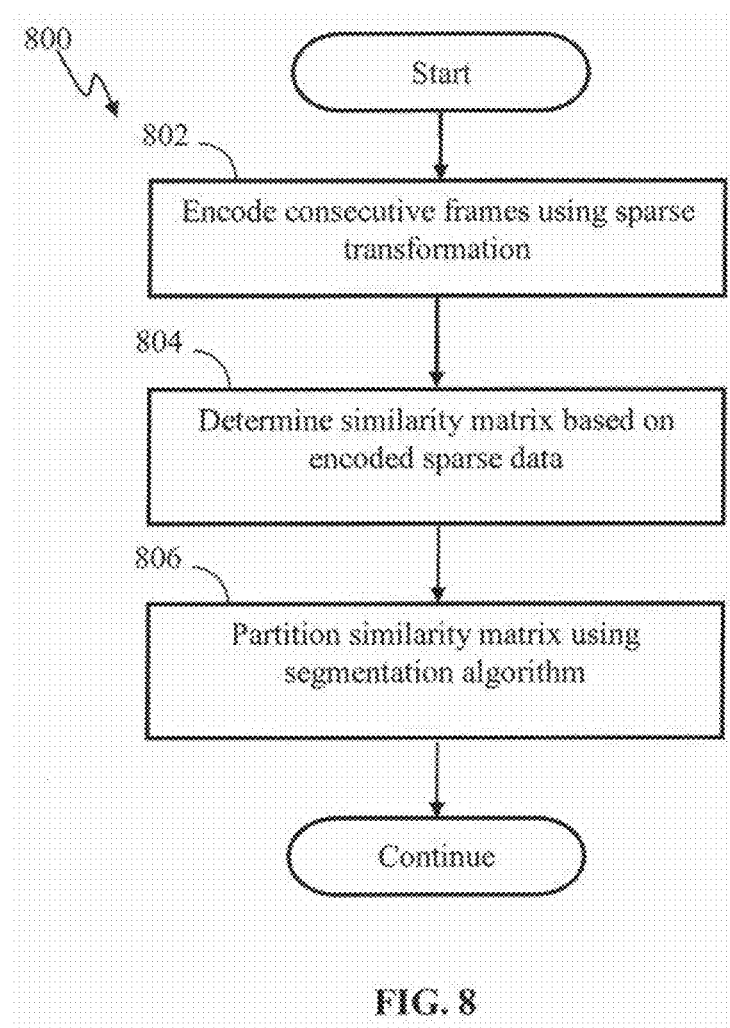
FIG. 8 is a logical flow diagram illustrating a method of data processing useful for determining features, in accordance with one or more implementations.
Figure 9:
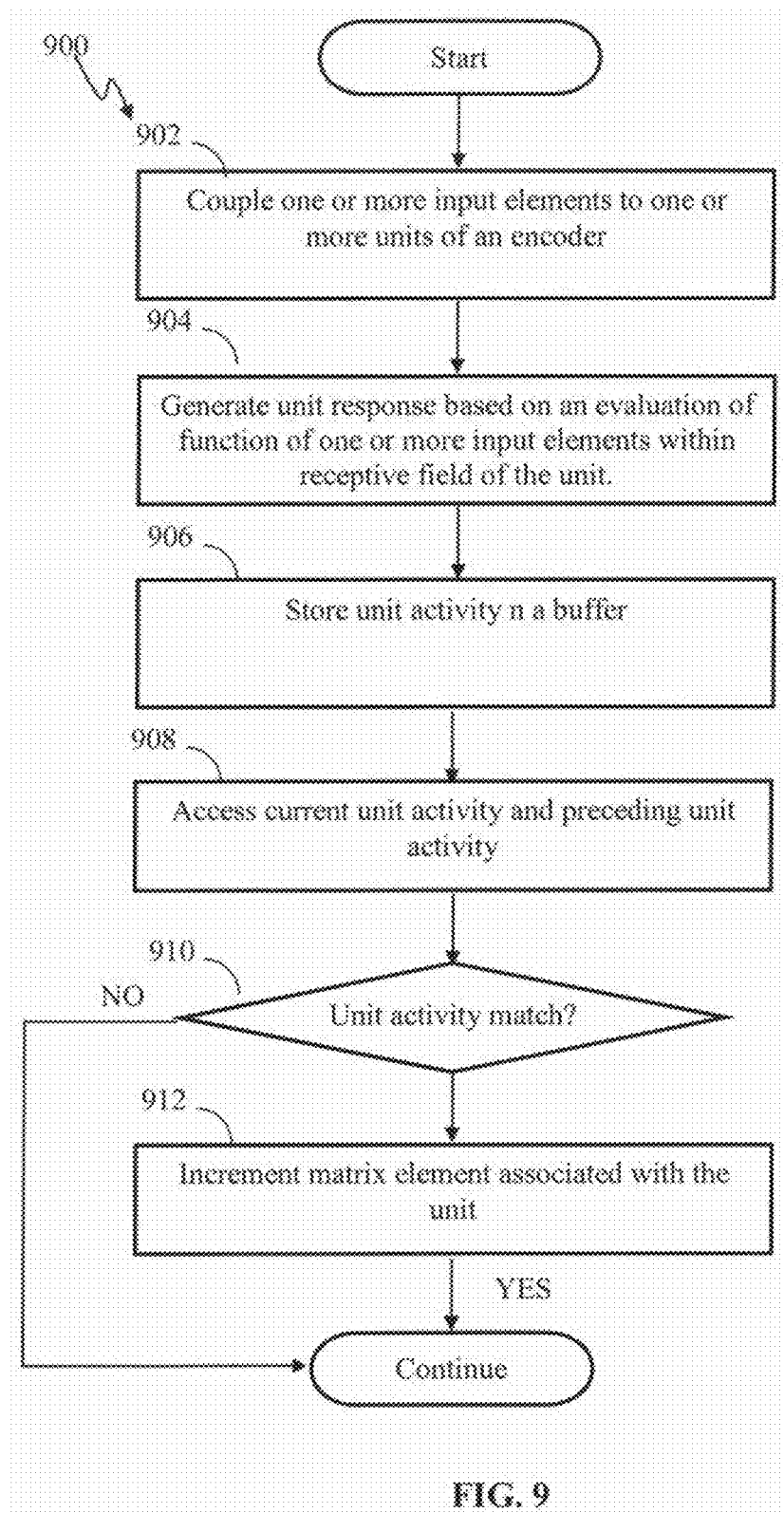
FIG. 9 is a logical flow diagram illustrating a method of determining temporally proximate patterns in sensory input, in accordance with one or more implementations.

FIGS. 8 and 9 illustrate methods 800, 900 of determining temporally proximate patterns and/or features utilizing the methodology of the disclosure. The operations of methods 700, 800, 900 presented below are intended to be illustrative. In some implementations, method 700, 800, 900 may be accomplished with one or more additional operations not described, and/or without one or more of the operations discussed. Additionally, the order in which the operations of method 800, 900 are illustrated in FIGS. 8-9 and described below is not intended to be limiting.

In some implementations, methods 800, 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 800, 900 in response to instructions stored electronically on an electronic storage medium. The one or more processing devices may include one or more devices configured through hardware, firmware, and/or software to be specifically designed for execution of one or more of the operations of methods 800, 900.

FIG. 8 illustrates a method of determining temporally proximate patterns in input data in accordance with one or more implementations. Operations of method 800 may be applied to processing of sensory data (e.g., audio, video, RADAR imagery, SONAR imagery, and/or other imagery), observation data, motor command activity in a robotic system, and/or other systems or data.

At operation 802 of method 800, a consecutive input frames are encoded using sparse transformation. In one or more implementations, the input frames may be provided by an image sensor (e.g., a charge-coupled device (CCD), CMOS device, and/or an active-pixel sensor (APS), photodiode arrays, and/or other image sensors). In some implementations, the input may comprise a pixel stream downloaded from a file, such as a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/other image representations) may be applicable to and useful with the various implementations. Data frames corresponding to other (non-visual) signal modalities such as sonograms, IR, radar or tomography images may be compatible with the processing methodology of the disclosure, and/or other configurations. The sparse transformation of operation 802 may be effectuated by one or more units of ANN characterized by receptive fields configured to evaluate multiple pixels of input frames. In some implementations of ANN (e.g., such as shown and described with respect to FIG. 10B), the sparse transformation may comprise coupling n-inputs 1032 to m neurons $1036\_1$, $1036\_m$ via connections 1040. Connections 1040 may be characterized by an array of weights (n×m). Individual weight components of the array may be adjusted during learning based on adding the input vector to the weights scaled by a small learning rate for the weights corresponding to the small number of neurons that were active for a given input. Learned weights can be made more independent by employing Matching-Pursuit or similar methods which orthogonalize the input being learned.

At operation 804, a similarity matrix may be determined using the result of Eqn. 2 or Eqn. 2.1.

At operation 806, the similarity matrix may be partitioned into one or more segments via a segmentation algorithm. In some implementations, the segmentation may be effectuated using the SOM approach. First the result of Eqn. 3 is computed this result is provided as input to the SOM. The SOM then determines which of the internal units most resembles the input (smallest distance between the internal units' receptive field and the input); this internal unit that most resembles the input is then designated as the unit to respond (output=a). When internal SOM unit i responds, it indicates the presence of partition/segment number i being present. Output of the segmentation operation 806 may be viewed as compression of the similarity matrix S into one or more segments that may indicate presence of one or more persistent features in the input. In some implementations of ANN (e.g., such as shown and described with respect to FIG. 10B), the compression of operation 806 transformation may comprise coupling m-units (1036_1, 1036_m) to k output units (e.g., two units 1050, 1052 in FIG. 10B) via connections 1042. Connections 1042 may be characterized by an array of weights (m×2). Individual weight components of the array may be adjusted during learning based on adding the input vector to the weights scaled by a small learning rate for the weights corresponding to the small number of neurons that were active for a given input. Further, learned weights can be made more independent by employing Matching-Pursuit or similar methods which orthogonalize the input being learned.

FIG. 9 illustrates a method of determining temporally proximate patterns in sensory input, in accordance with one or more implementations.

At operation 902 of method 900, one or more input channels may be coupled to one or more units of an encoder. In some implementations, individual input channels may correspond to pixels of a digital frame; the units may correspond neurons of ANN, (e.g., such as shown and described with respect to FIG. 10B).

At operation 942, one or more units may respond to input stimuli. Unit response may be determined based on an evaluation of function of one or more input elements within receptive field of the unit and/or weights associated with connections coupling the input array to the unit array of the encoder (e.g., the connections 1040 in FIG. 10B).

At operation 906, one or more responses by the encoder units at time t may be stored in a buffer. In one or more implementations, the buffer may comprise unit memory (e.g., shift register), e.g. as described in, for example, U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

At operation 908 current unit activity and preceding unit activity may be accessed. In one or more implementations, the unit activity access may comprise reading neuron activity memory. Unit activity may be utilized in determining similarity matrix.

At operation 910 a determination may be made as to whether current unit activity matches prior unit activity. The unit activity evaluation may be implemented using, e.g., Eqn. 4. In some implementations wherein number of inactive units exceeds number active units, the unit activity parameter α may correspond to unit generating a response (e.g., a spike in SNN implementations). In one or more implementations wherein number of active units exceeds number inactive units, the unit activity parameter α may correspond to absence of response by the unit (e.g., pause as described in U.S. patent application Ser. No. 13/761,090, entitled "APPARATUS AND METHODS FOR GATING ANALOG AND SPIKING SIGNALS IN ARTIFICIAL NEURAL NETWORKS", filed Feb. 6, 2013, the foregoing being incorporated supra).

Responsive to determination at operation 910 that prior unit activity matches present unit activity, the method may proceed to operations 912, wherein value of an element of the similarity matrix that is associated with the unit being evaluated at operation 910 may be incremented. The increment may be effectuated using Eqn. 4 with the increment value selected equal one in one or more implementations.

Various exemplary computational apparatus configured to implement temporal proximity detection mechanism of the disclosure are described below with respect to FIGS. 10A-11C.

One such apparatus configured to process sensory information using temporal proximity detection methodology of the present disclosure. The apparatus 1000 may comprise an encoder 1010 that may be configured to receive sensory input 1002 from at least one sensor apparatus. In some applications, such as an artificial retinal prosthetic, the input 1002 may be a visual input, and the encoder 1010 may comprise one or more diffusively coupled photoreceptive layer as described in U.S. patent application Ser. No. 13/540,429, filed Jul. 2, 2012 and entitled "SENSORY PROCESSING APPARATUS AND METHODS", incorporated supra. The visual input may comprise, for instance, ambient visual light captured through, inter alia, an eye lens. For example for the encoding of light gathered by a lens 1064 in visual capturing device 1060 (e.g., telescope, motion or still camera) illustrated in FIG. 10C, the sensory input 1002 may comprise ambient light stimulus 1062 captured by device lens 1064. In one or more implementations, (such as the encoder 1076 configured for processing of digitized images in a processing apparatus 1070 described with respect to FIG. 10C below), the sensory input 1002 of FIG. 10A may comprise digitized frame pixel values (RGB, CMYK, grayscale) refreshed at £! suitable rate.

Figure 10A:
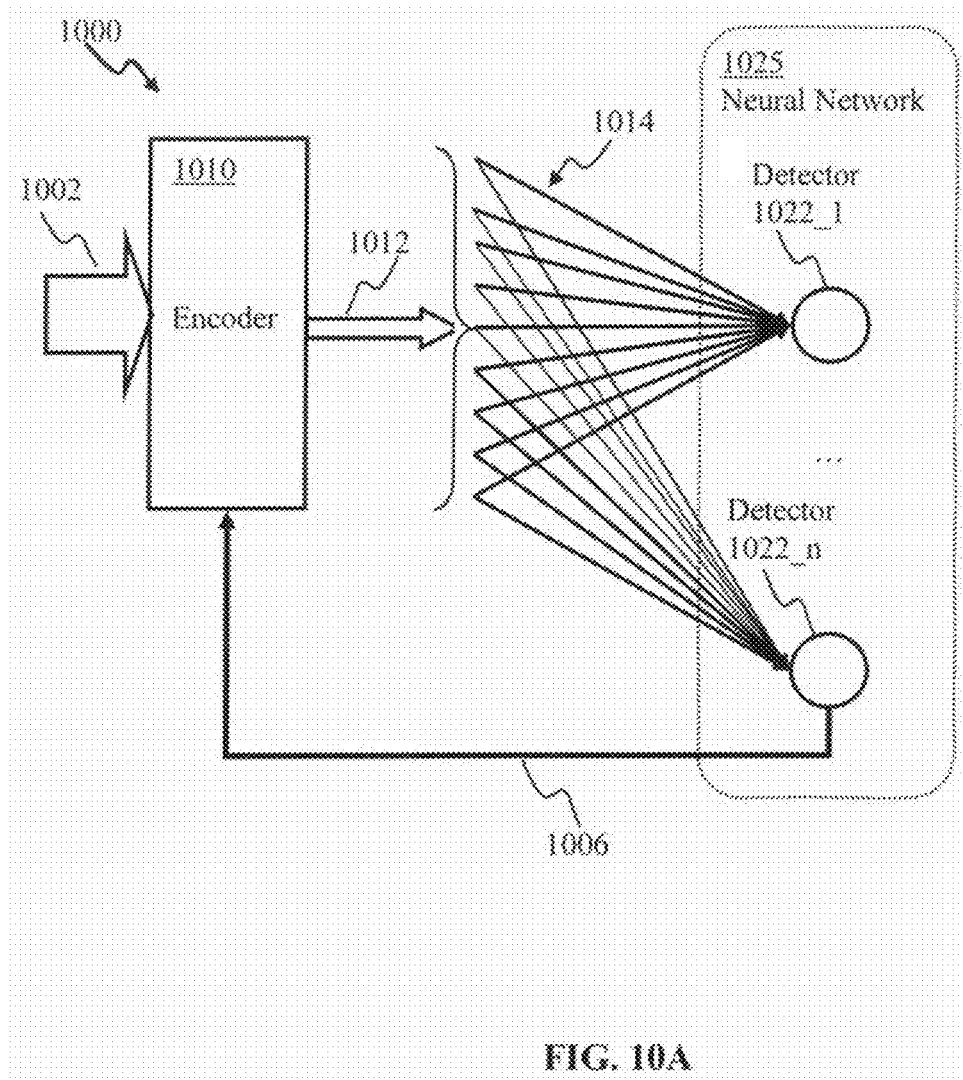
FIG. 10A is a block diagram illustrating a processing apparatus comprising a temporally proximate feature encoding mechanism, in accordance with one or more implementations.
Figure 10B:
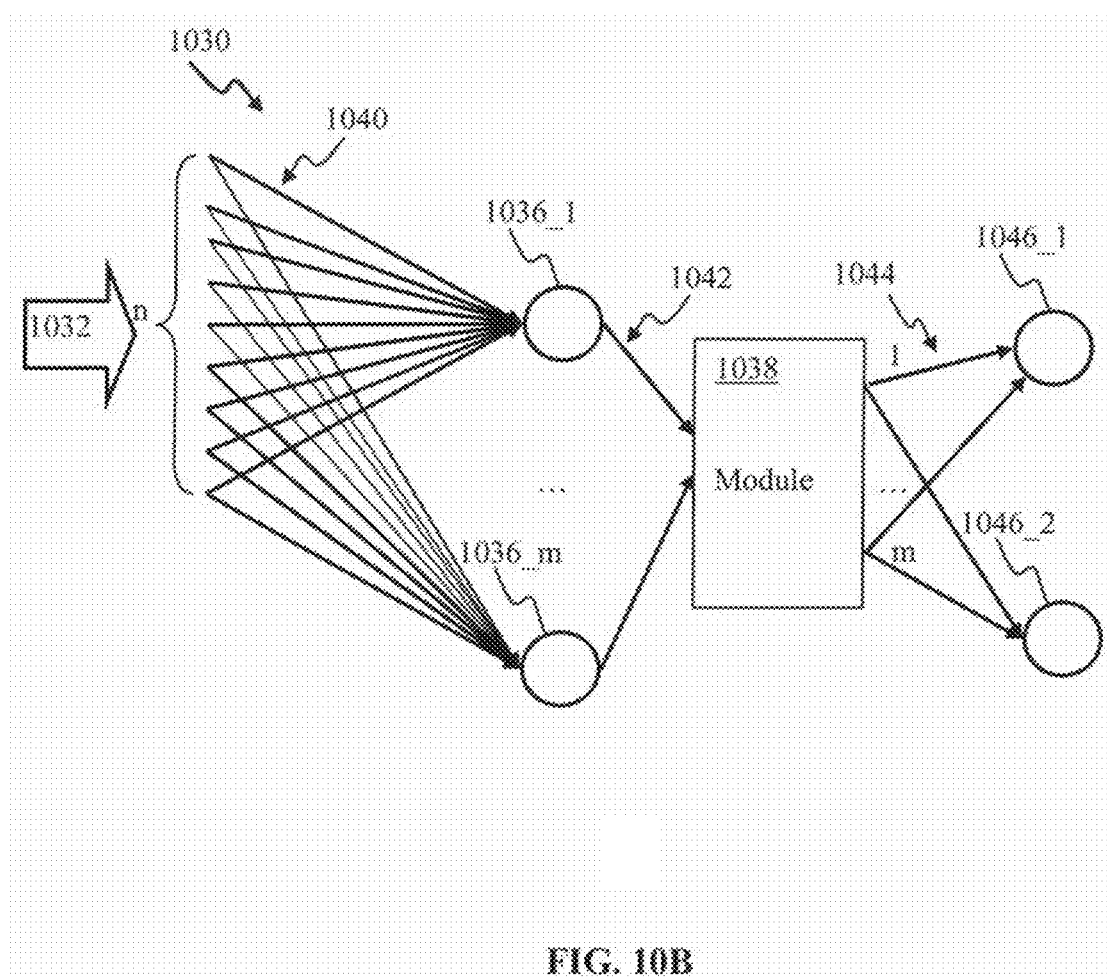
FIG. 10B is a block diagram illustrating a processing apparatus configured for input classification, in accordance with one or more implementations.
Figure 10C:
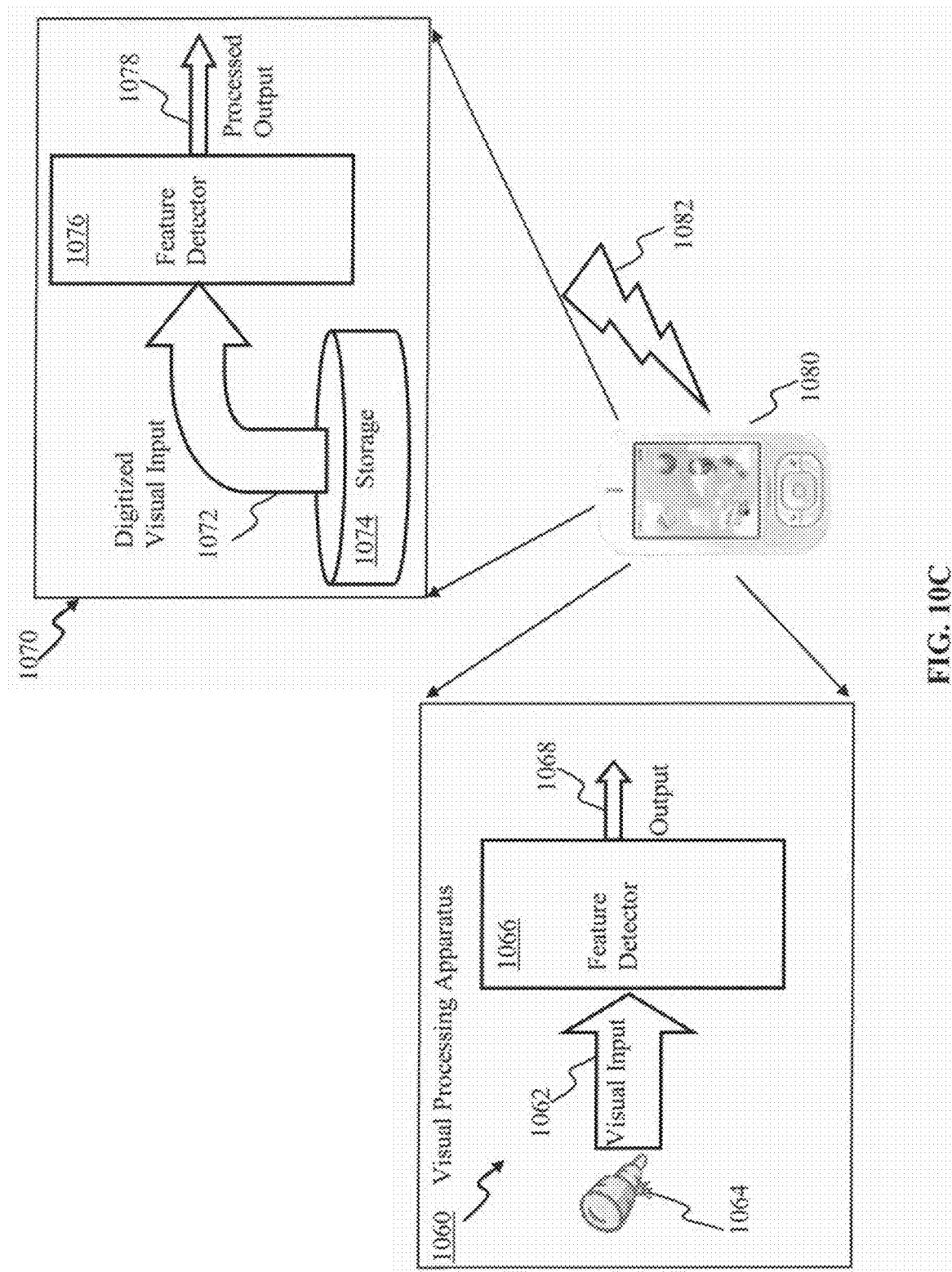
FIG. 10C is a block diagram illustrating an encoder apparatus (such as for instance that of FIG. 10A) configured for use in an image processing device adapted to process (i) visual signal; and/or (ii) processing of digitized image, in accordance with one or more implementations.

The input 1002 may comprise light gathered by a lens of a portable video communication device, such as the device 1080 shown in FIG. 10C. In one implementation, the portable device comprises a smartphone configured to process still and/or video images using a diffusively coupled photoreceptive layer. The processing may comprise for instance image encoding and/or image compression using, for example, a processing neuron layer. In some approaches, encoding and/or compression of the image may be utilized to aid communication of video data via remote link (e.g., cellular, Bluetooth, Wi-Fi, LTE, etc.), thereby reducing bandwidth demands on the link.

In some implementations, the input may comprise light gathered by a lens of an autonomous robotic device (e.g., a rover, an autonomous unmanned vehicle, etc.), which may include, for example, a camera configured to process still and/or video images using, inter alia, one or more diffusively coupled photoreceptive layers. The processing may comprise image encoding and/or image compression, using for example processing neuron layer. For instance, higher responsiveness of the diffusively coupled photoreceptive layer may advantageously be utilized in rover navigation and/or obstacle avoidance.

It will be appreciated by those skilled in the art that the apparatus 1000 may be also used to process other sensory modalities (e.g., audio, somatosensory and/or gustatory), and/or inputs of various electromagnetic wavelengths, such as, visible, infrared, ultraviolet light, and/or combination thereof. Furthermore, the bi-modal plasticity methodology of the disclosure may be equally useful for encoding radio frequency (RF), magnetic, electric, or sound wave information.

Returning now to FIG. 10A, the input 1002 may be encoded by the encoder 1010 using, inter alia, spike latency encoding mechanism described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE- CODE INVARIANT OBJECT RECOGNITION", each of the foregoing being incorporated herein by reference in its entirety.

In one implementation, such as illustrated in FIG. 10A, the apparatus 1000 may comprise a neural network 1025 configured to detect an object and/or object features using, for example, temporal proximity detection mechanism of the disclosure. The encoded input 1012 may comprise a plurality of pulses (also referred to as a group of pulses) transmitted from the encoder 1010 via multiple connections (also referred to as transmission channels, communication channels, or synaptic connections) 1014 to one or more neuron units (also referred to as the detectors) 1022 of the spiking network apparatus 1025. Although only two detectors (1022_1, 1022_n) are shown in the implementation of FIG. 10A (for reasons of clarity), it is appreciated that the encoder 1010 may be coupled to any number of detector nodes that may be compatible with the apparatus 1000 hardware and software limitations. Furthermore, a single detector node may be coupled to any practical number of encoders. In some implementations, the input 1002 may be coupled to neurons 1022.

The processing apparatus implementation illustrated in FIG. 10A may further comprise feedback connections 1006. In some variants, connections 1006 may be configured to communicate context information as described in detail in U.S. patent application Ser. No. 13/465,924, entitled "SPIKING NEURAL NETWORK FEEDBACK APPARATUS AND METHODS", filed May 7, 2012, incorporated supra.

FIG. 10B illustrates a neuron network processing apparatus configured for data classification, in accordance with one or more implementations. The apparatus 1030 may be operated to determine temporally proximate patterns in the similarity matrix using methodology described herein The apparatus 1030 may comprise one or more encoders configured to receive input 1032 from the sensor apparatus. In some visual processing applications, the input 1032 may comprise digitized pixel stream characterizing one or more aspects of the sensory data (e.g., chromaticity and/or luminance). The input 1032 may comprise other sensory modalities (e.g., audio). In remote sensing applications, the input 1032 may comprise one or more sensor inputs (e.g., infrared, visual, radio frequency, sound, X-ray, and or other signals).

The input 1032 may be coupled to a layer of encoder units 1036 via a plurality of connections 1040. For input array of size n coupled to encoder layer of size, the connections 1040 may be characterized by an array of weights (size of n×m). Individual weight components of the array may be adjusted during learning based on adding the input vector to the weights scaled by a small learning rate for the weights corresponding to the small number of neurons that were active for a given input, e.g., using Eqn. 11, Eqn. 12. Further, learned weights can be made more independent by employing Matching-Pursuit or similar methods which orthogonalize the input being learned.

Although only two units (1036_1, 1036_m) are shown in the implementation of FIG. 10B (for reasons of clarity), it is appreciated that the input layer of the apparatus 1030 may be coupled to any number of encoder nodes that may be compatible with the apparatus 1030 hardware and software. A single detector node may be coupled to any practical number of encoders.

In one or more implementations, the encoders 1036_1, 1036_m may contain logic (which may be implemented as a software code, hardware logic, and/or a combination of thereof) configured to generate a response based on a combination of inputs 1032 and weights 1040 associated with the respective encoder unit.

Encoded output (e.g., v of Eqn. 1) of the units 1036_1 to 1036_m may be provided to module 1038. The module 1038 may implement similarity matrix determination (e.g., using Eqn. 4, Eqn. 5). The module 1038 may contain logic (which may be implemented as a software code, hardware logic, and/or a combination of thereof) configured to determine input 1044 into module comprising units 10461, 1046_2. In some implementations, the input into the input 1044 may be determined based on the similarity matrix using, e.g., Eqn. 8. The units neurons 1046_1, 1046_2 may be referred to as a classification layer.

In some implementations, e.g., such as illustrated in FIG. 7, the classification layer of apparatus 1030 may comprise two units 1036_1, 10362 configured to generate signal indicating as to whether a given pattern within the similarity matrix matches one of the two classes (e.g., partitions 702, 712 in FIG. 7). For encoder layer of size m, the connections 1044 may be characterized by an array of weights (size of 2×m). Individual weight components of the array of connection 1044 weights may be adjusted during learning based on adding the input vector to the weights scaled by a small learning rate for the weights corresponding to the small number of neurons that were active for a given input, e.g., using Eqn. 11, Eqn. 12. Learned weights can be made more independent by employing Matching-Pursuit or similar methods which orthogonalize the input being learned.

The output of the classification layer units 1036_1, 1036_m, may be provided to other components (e.g., a motor control blocks, saccading block).

FIG. 10C illustrates exemplary uses of temporal proximity detection methodology described herein. The visual processing apparatus 1060 of FIG. 10C comprises a feature detector 1066, adapted for use with ambient visual input 1062. The detector 1066 of the processing apparatus 1060 is disposed behind a light gathering block 1064 and receive ambient light stimulus 1062. The light gathering block 1064 may comprise a telescope, motion or still camera, microscope. Accordingly, the visual input 1062 may comprise ambient light captured by a lens. The light gathering block 1064 may further comprise an imager apparatus (e.g., CCD, an active-pixel sensor array, and/or other imager apparatus) and may generate a stream of pixel values.

In various implementations, temporal proximity detection mechanism may be employed in the visual processing apparatus 1070 shown and described with respect to FIG. 10C. The visual processing apparatus 1070 may be configured for digitized visual input processing. The visual processing apparatus 1070 may comprise a feature detector 1076, adapted for use with digitized visual input 1072. The visual input 1072 of FIG. 10C may comprise for example digitized frame pixel values (e.g., RGB, CMYK, grayscale, and/or other pixel values) that may be refreshed from a digital storage device 1074 at a suitable rate.

The encoder apparatus 1066, 1076 may employ, for example, an artificial neuron network, configured in accordance with one or more plasticity rules, such as described in U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, incorporated supra.

In one or more implementations, the video capture device 1160 and/or processing apparatus 1070 may be embodied in a portable visual communications device 1080, such as smartphone, digital camera, security camera, and/or digital video recorder apparatus, and/or other. The feature detection techniques of the present disclosure may be used to compress visual input (e.g., 1062, 1072 in FIG. 10C) in order to reduce the bandwidth that may be utilized for transmitting processed output (e.g., the output 1068, 1078 in FIG. 10C) by the apparatus 1080 via a wireless communications link 1082 in FIG. 10C.

Figure 11A:
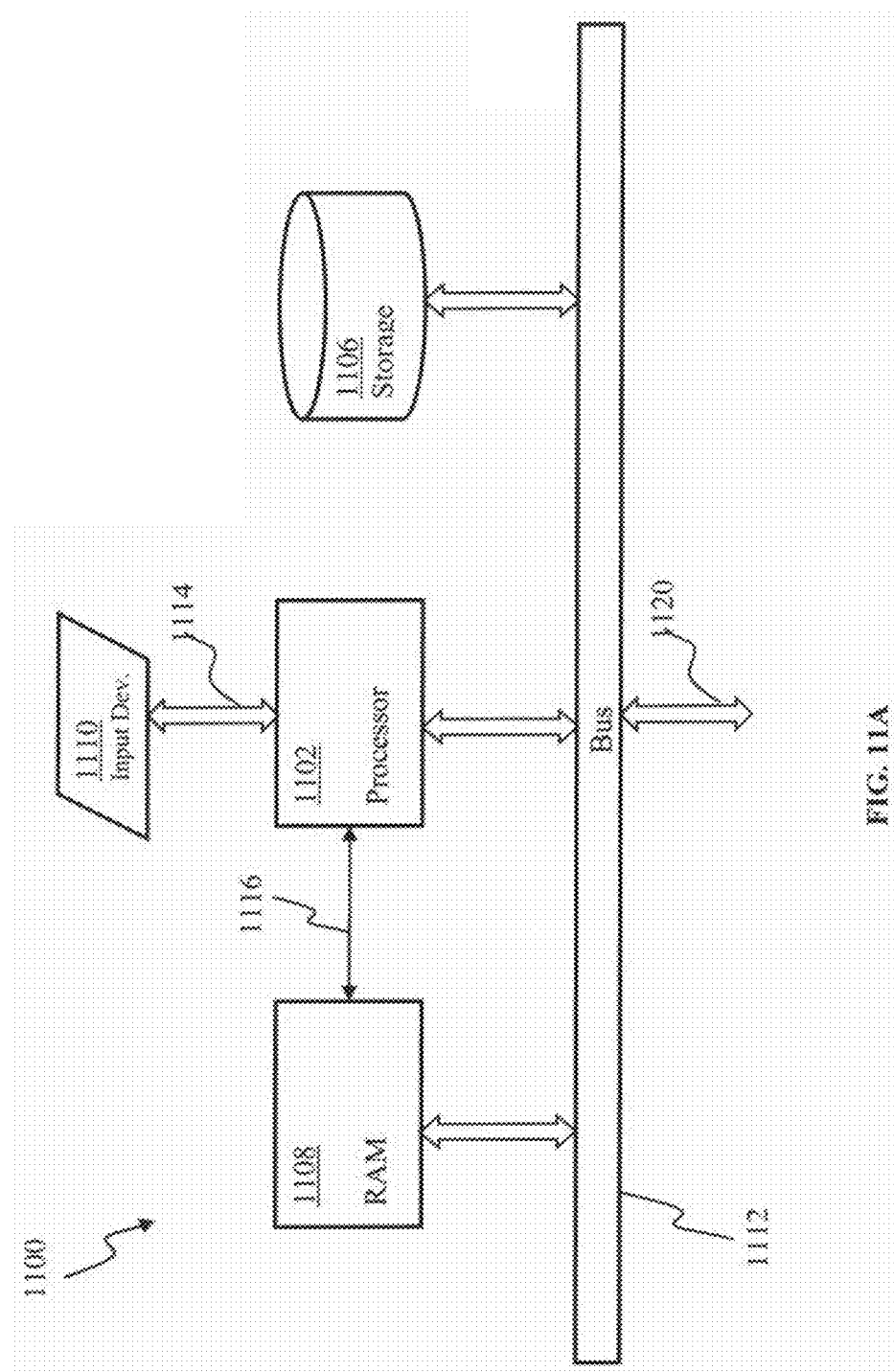
FIG. 11A is a block diagram illustrating a computerized system useful with a temporally proximate feature detection mechanism, in accordance with one or more implementations.

One exemplary implementation of the computerized neuromorphic processing system, for implementing temporal proximity detection methodology described herein, is illustrated in FIG. 11A. The computerized system 1100 of FIG. 1 1A may comprise an input device and/or sensor apparatus 1110, such as, for example, an image sensor and/or digital image interface. The sensor apparatus 1110 may be coupled to the processing block (e.g., a single or multi-processor block) via the input communication interface 1114. In some implementations, the interface 1114 may comprise a wireless interface (e.g., cellular wireless, Wi-Fi, Bluetooth, and/or other wireless interface) that enables data transfer to the processor 1102 from remote I/O interface 1100. One such implementation may comprise a central processing apparatus, configured to employ bi-modal plasticity and coupled to one or more remote camera devices.

The system 1100 further may comprise a random access memory (RAM) 1108, configured to store neuronal states and connection parameters and to facilitate synaptic updates. In some implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 may be coupled to the processor 1102 via a direct connection (memory bus) 1116, and/or via a high-speed processor bus 1112. In some implementations, the memory 1108 may be embodied within the processor block 1102.

The system 1100 may further comprise a nonvolatile storage device 1106, comprising, inter alia, computer readable instructions configured to implement various aspects of spiking neuronal network operation (e.g., sensory input encoding, connection plasticity, operational models of neurons, and/or other spiking neuronal network operation). The nonvolatile storage 1106 may be used to store state information of the neurons and connections when, for example, saving/loading network state snapshot, or implementing context switching (e.g., saving current network configuration (comprising, inter alia, connection weights and update rules, neuronal states and learning rules, and/or other network configuration components) for later use and loading previously stored network configuration).

In some implementations, the computerized apparatus 1100 may be coupled to one or more external devices (e.g., an external processing device, an external storage device, an external input device) via an I/O interface 1120, such as a computer I/O bus (PCI-E), wired (e.g., Ethernet) or wireless (e.g., Wi-Fi) network connection.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to implementations including, for example, an LCD/LED monitor, touch-screen input and display device, speech input device, stylus, light pen, trackball, and/or other input/output interfaces.

Figure 11B:
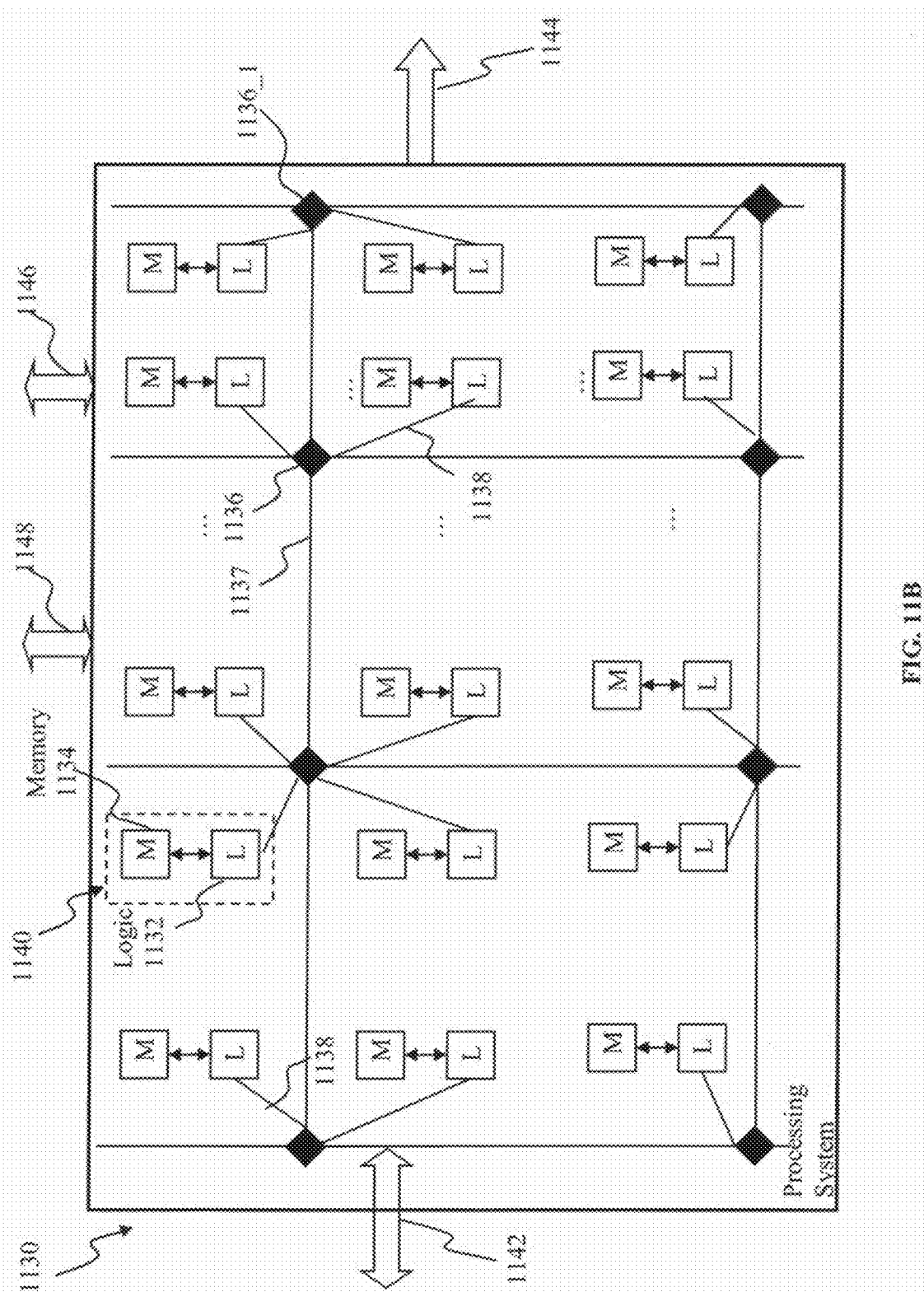
FIG. 11B is a block diagram illustrating a neuromorphic computerized system useful with useful with a temporally proximate feature detection mechanism in accordance with one or more implementations.

FIG. 11B, depicts a neuromorphic computerized system configured for implementing temporal proximity detection methodology described supra. The neuromorphic processing system 1130 of FIG. 11B may comprise a plurality of processing blocks (micro-blocks) 1140, where individual micro cores may comprise logic block 1132 and memory block 1134, denoted by 'L' and 'M' rectangles, respectively, in FIG. 11B. The logic block 1132 may be configured to implement various aspects of feature detection, such as the latency encoding, neuron unit dynamic model, detector nodes 1022 of FIG. 10A, and/or nodes 1050, 1052 of FIG. 10B. The logic block may implement connection updates (e.g., the connections 1014, 1026 in FIG. 10A) and/or other tasks relevant to network operation. In some realizations of spiking neuron networks, the update rules may comprise rules spike time dependent plasticity (STDP) updates, such as shown and described in Patent Application '005 references above. The memory block 1134 may be configured to store, inter alia, neuronal state variables and connection parameters (e.g., weights, delays, I/O mapping) of connections 1138.

One or more micro-blocks 1140 may be interconnected via connections 1138, routers 1136, and/or a bus 1137. In one or more implementations (not shown), the router 1136 may be embodied within the micro-block 1140. It is appreciated by those skilled in the arts, the connection layout in FIG. 11B is exemplary and many other connection implementations (e.g., one to all, all to all, etc.) are compatible with the disclosure.

The neuromorphic apparatus 1130 may be configured to receive input (e.g., visual input) from the interface 1142 in one or more implementations, applicable for example to interfacing with a pixel array, the apparatus 1130 may also provide feedback information via the interface 1142 to facilitate encoding of the input signal.

The neuromorphic apparatus 1130 may be configured to provide output (e.g., an indication of recognized object or a feature, or a motor command, for example, to zoom/pan the imaging array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). In one or more implementations, the apparatus 1130 may also interface to external slower memory (e.g., flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, the foregoing being incorporated herein by reference in its entirety.

Figure 11C:
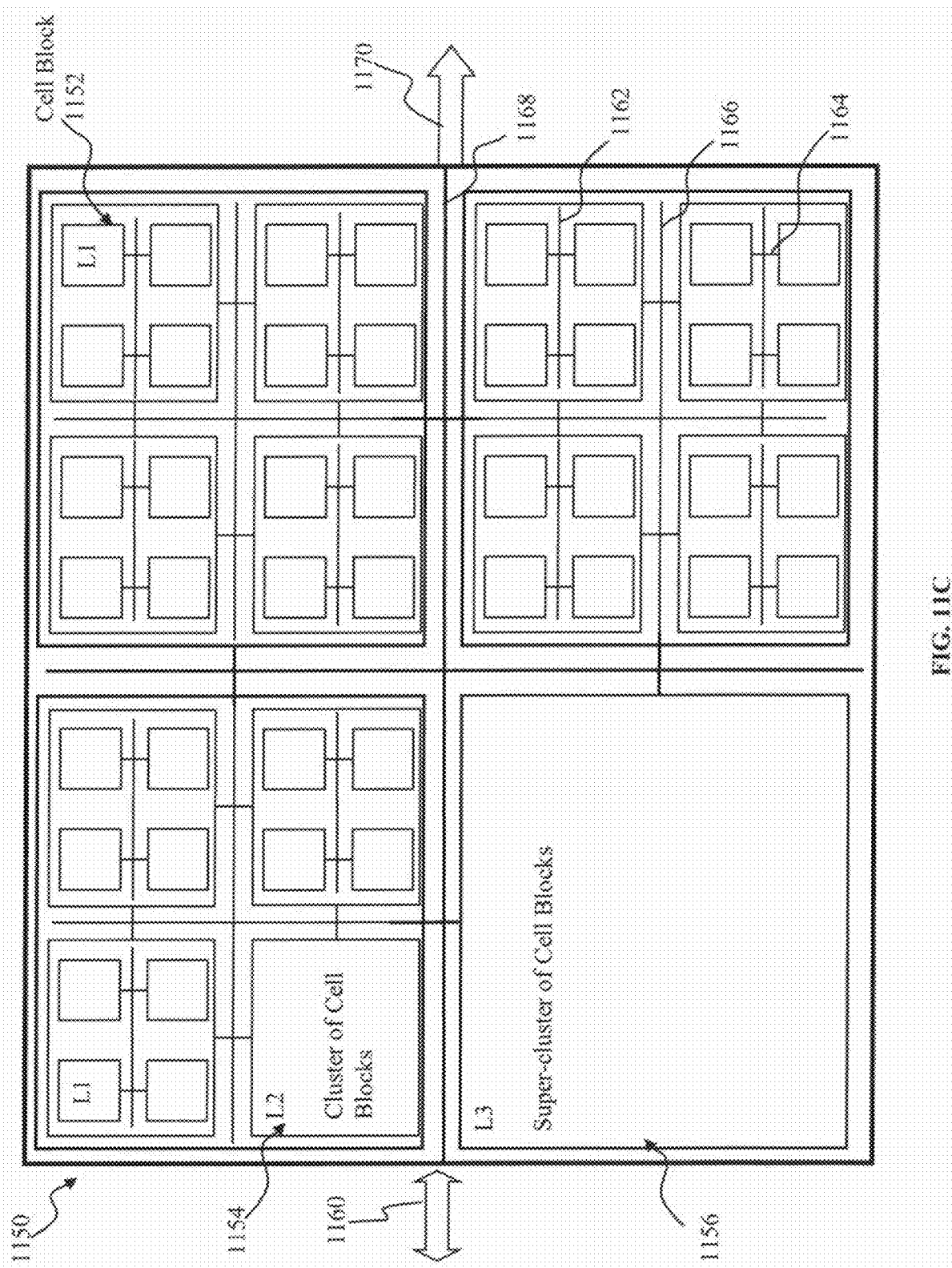
FIG. 11C is a block diagram illustrating a hierarchical neuromorphic computerized system architecture useful with temporally proximate feature detection mechanism, in accordance with one or more implementations.

FIG. 11C, illustrates a cell-based hierarchical neuromorphic system architecture configured to implement temporal proximity detection methodology described supra. The neuromorphic system 1150 of FIG. 11C may comprise a hierarchy of processing blocks (cells block) 1140. In some implementations, the lowest level L1 cell 1152 of the apparatus 1150 may comprise logic and memory and may be configured similar to the micro block 1140 of the apparatus shown in FIG. 11B, supra. A number of cell blocks 1052 may be arranges in a cluster 1154 and communicate with one another via local interconnects 1162, 1164. Each such cluster may form higher level cell, e.g., cell denoted L2 in FIG. 11C.

Several L2 level clusters may communicate with one another via a second level interconnect 1166 and form a super-cluster L3, denoted as 1156 in FIG. 11C. The super-clusters 1156 may communicate via a third level interconnect 1168 and may form a higher-level cluster. It will be appreciated by those skilled in the arts that hierarchical structure of the apparatus 1150, comprising four cells-per-level, shown in FIG. 11C represents one exemplary implementation and other implementations may comprise more or fewer cells per level, and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may perform different aspects of operating, for example, a robot/The robot may have one or more L2/L3 cells processing visual data from a camera, and other L2/L3 cells operating motor control block for implementing lens motion what tracking an object or performing lens stabilization functions.

The neuromorphic apparatus 1150 may receive visual input (e.g., the input 1002 in FIG. 10C) via the interface 1160. To interface with a latency encoder and/or an image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (e.g., the I/O 1160 of FIG. 11C).

The apparatus 1150, in one or more implementations, may interface to external fast response memory (e.g., RAM) via high bandwidth memory interface (not shown), thereby enabling storage of intermediate network operational parameters (e.g., spike timing, etc.). The apparatus 1150 may also interface to a larger external memory (e.g., flash, or magnetic (hard drive)) via a lower bandwidth memory interface (not shown), in order to facilitate program loading, operational mode changes, and retargeting, where network node and connection information for a current task may be saved for future use and flushed, and previously stored network configuration may be loaded in its place. Exemplary implementations of this process are described in co-pending and co-owned U.S. patent application Ser. No. 13/487,576, filed Jun. 4, 2012 and entitled "DYNAMICALLY RECONFIGURABLE STOCHASTIC LEARNING APPARATUS AND METHODS", incorporated supra.

The networks of the apparatus 1130, 1145, 1150 may be implemented using Elementary Network Description (END) language, described for example in U.S. patent application Ser. No. 13/239,123, entitled "ELEMENTARY NETWORK DESCRIPTION FOR NEUROMORPHIC SYSTEMS WITH PLURALITY OF DOUBLETS WHEREIN DOUBLET EVENTS RULES ARE EXECUTED IN PARALLEL", filed Sep. 21, 2011, and/or a High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, each of the foregoing being incorporated herein by reference in its entirety. In some implementations, the HLND framework may be configured to handle event-based update methodology described, for example U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012, the foregoing being incorporated herein by reference in its entirety. In some implementations, the networks may be updated using an efficient network update methodology, described, for example, in U.S. patent application Ser. No. 13/239,259, entitled "APPARATUS AND METHOD FOR PARTIAL EVALUATION OF SYNAPTIC UPDATES BASED ON SYSTEM EVENTS", filed Sep. 21, 2011 and U.S. patent application Ser. No. 13/560,891, entitled "APPARATUS AND METHODS FOR EFFICIENT UPDATES IN SPIKING NEURON NETWORK", filed Jul. 27, 2012, each of the foregoing being incorporated herein by reference in its entirety.

In some implementations, the HLND framework may be utilized to define network, unit type and location, and/or synaptic connectivity. HLND tags and/or coordinate parameters may be utilized in order to, for example, define an area of the localized inhibition of the disclosure described above.

In some implementations, the END may be used to describe and/or simulate large-scale neuronal model using software and/or hardware engines. The END allows optimal architecture realizations comprising a high-performance parallel processing of spiking networks with spike-timing dependent plasticity. Neuronal network configured in accordance with the END may comprise units and doublets, the doublets being connected to a pair of units. Execution of unit update rules for the plurality of units is order-independent and execution of doublet event rules for the plurality of doublets is order-independent.

In one or more implementations, the efficient update methodology (e.g., for adjusting input connections and/or inhibitory traces) may comprise performing of pre-synaptic updates first, followed by the post-synaptic updates, thus ensuring the up-to-date status of synaptic connections. In some implementations, the efficient update methodology may comprise rules, configured to adjust inhibitory trace without necessitating evaluation of the neuron post-synaptic response.

Methodology for detecting temporally proximate patterns may be utilized in processing of sensory data, bibliographic classification, image browsing systems, medical Diagnosis, processing of geophysical data (e.g., interpreting seismic activity), speech recognition, data compression, identifying sound sources, environmental modelling, and/or in other applications.

Various aspects of the disclosure may advantageously be applied to design and operation of apparatus configured to process sensory data. Utilizing the temporal continuity of spatial transformations of an object may allow a learning system to bind temporally proximal entities into a single object, as opposed to several separate objects. This may reduce memory requirement for storing object data, increase processing speed, and/or improve object detection/recognition accuracy. These advantages may be leveraged to increase processing throughput (for a given neuromorphic hardware resources) and/or perform the same processing with a reduced complexity and/or cost hardware platform, compared to the prior art.

The principles described herein may be combined with other mechanisms of data encoding in neural networks, such as those described in U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No.

13/152,119, Jun. 2, 2011, entitled "SENSORY INPUT PROCESSING APPARATUS AND METHODS", and U.S. patent application Ser. No. 13/152,105 filed on Jun. 2, 2011, and entitled "APPARATUS AND METHODS FOR TEMPORALLY PROXIMATE OBJECT RECOGNITION", incorporated, supra.

Advantageously, exemplary implementations of the present innovation may be useful in a variety of applications including, without limitation, video prosthetics, autonomous and robotic apparatus, and other electromechanical devices requiring video processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), and/or other autonomous vehicles Implementations of the principles of the disclosure are applicable to video data processing (e.g., compression) in a wide variety of stationary and portable video devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person and/or a special payment symbol) and/or other applications.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A system for temporal proximity detection, comprising:
a sensor apparatus configurable to receive input of first sensory data generated at a first time, and second sensory data generated at a second time;
a processing device configurable to execute computer readable instructions to:
cause an encoder to reduce the first sensory data into a first frame and the second sensory data into a second frame, the encoder comprising a plurality of nodes, wherein each one of respective plurality of nodes corresponds to a respective node,
generate a similarity matrix comprising a first element indicative at least in part of a comparison between activations of one or more respective nodes in the first frame and a second element indicative of activations of one or more respective nodes in the second frame, the activations of the one or more respective nodes in the first frame are independent of the one or more respective nodes in the second frame,
assign the first and second elements to a first cluster of a plurality of clusters based on a difference measure of the first and second elements, the assignment of the first and second elements to the first cluster indicates the presence of at least one temporally persistent feature in the first and second sensory data; and
produce a motor control output to move a robotic device in response to the at least one temporally persistent feature detected based at least in part on the first cluster,
wherein the first element is stored in a memory buffer until the second sensory data is received and the corresponding second element is generated for the similarity matrix.

2. The system of claim 1, wherein the first sensory data and the second sensory data are images.

3. The system of claim 1, wherein the sensor apparatus is configurable to generate the first sensory data and the second sensory data.

4. The system of claim 3, wherein the sensor apparatus comprises at least one of a visible light sensor, camera, audio sensor, pressure sensor, and radar device.

5. The system of claim 1, wherein the segmentation includes an evaluation of a distance between one or more elements of the similarity matrix.

6. The system of claim 1, wherein the first and second elements of the first cluster are characterized by a similarity to one or more elements within the same cluster and no similarity to one or more elements in other clusters of the plurality of clusters.

7. The system of claim 1, wherein the activations of the one or more nodes in the first frame create an identification.

8. The system of claim 1, wherein the first frame and the second frame comprise different modalities.

9. The system of claim 1, wherein the first time and the second time occur within a time window having a duration between 0.1 milliseconds to 10 seconds, inclusive.

10. A method for temporal proximity detection, comprising:
receiving, from a sensor apparatus, input of first sensory data generated at a first time and second sensory data generated at a second time;
causing an encoder to reduce the first sensory data into a first frame and the second sensory data into a second frame, the encoder comprising a plurality of nodes, wherein each one of respective plurality of nodes corresponds to a respective node;
generating a similarity matrix comprising a first element indicative at least in part of a comparison between activations of one or more respective nodes in the first frame and a second element indicative of activations of one or more respective nodes in the second frame, the activations of the one or more respective nodes in the first frame are independent of the one or more respective nodes in the second frame;

assigning the first and second elements to a first cluster of a plurality of clusters based on a difference measure of the first and second elements, the assignment of the first and second elements to the first cluster indicates the presence of at least one temporally persistent feature in the first and second sensory data;

and producing a motor control output to configured to move a robotic device in response to the at least one temporally persistent feature detected based at least in part on the first cluster, wherein the first element is stored in a memory buffer until the second sensory data is received and the corresponding second element is generated for the similarity matrix.

11. The method of claim 10, further comprising:
identifying temporally proximate patterns of the first sensory data and the second sensory data based at least on the plurality of clusters of the similarity matrix.

12. The method of claim 10,
wherein: the first sensory data and the second sensory data are images.

13. The method of claim 11, wherein the identifying of the temporally persistent feature comprises determining similarity to one or more elements within the first cluster and no similarity between the one or more elements of the first cluster and elements of a second cluster of the plurality of clusters.

14. The method of claim 10, wherein the segmenting comprises at least one of self-organized mapping, k-means, clustering, spectral clustering, sparse coding, and principal component analysis.

15. The method of claim 10, wherein the first time and the second time occur within a time window having a duration between 0.1 milliseconds to 10 seconds, inclusive.

16. A non-transitory computer-readable storage medium comprising a plurality of computer readable instructions stored thereon, that when executed by a processing device configure the processing device to:

receive, from a sensor apparatus, input of first sensory data generated at a first time and second sensory data generated at a second time;

cause an encoder to reduce the first sensory data into a first frame and the second sensory data into a second frame, the encoder comprising a plurality of nodes, wherein each one of respective plurality of nodes corresponds to a respective node;

generate a similarity matrix comprising a first element indicative at least in part of a comparison between activations of one or more respective nodes in the first frame and a second element indicative of activations of one or more respective nodes in the second frame, the activations of the one or more respective nodes in the first frame are independent of the one or more respective nodes in the second frame;

assign the first and second elements to a first cluster of a plurality of clusters based on a difference measure of the first and second elements, the assignment of the first and second elements to the first cluster indicates the presence of at least one temporally persistent feature in the first and second sensory data;

and produce a motor control output to configured to move a robotic device in response to the at least one temporally persistent feature detected based at least in part on the first cluster, wherein the first element is stored in a memory buffer until the second sensory data is received and the corresponding second element is generated for the similarity matrix.

17. The non-transitory computer-readable storage medium of claim 16, wherein the processing device is configured to perform a sparse transformation on the first and second sensory data.

18. The non-transitory computer-readable storage medium of claim 16, wherein the first frame and the second frame each correspond to activations of the respective one or more nodes in the first and second frames.

19. The non-transitory computer-readable storage medium of claim 18, wherein the activations of the one or more respective nodes in the first and second frames forms an identification of the first frame and of the second frame.

20. The non-transitory computer-readable storage medium of claim 16, wherein the processing device is further configured to execute the computer readable instructions to further cause the processing apparatus to identify temporal proximity based at least in part on elements being within a same partition.

21. The non-transitory computer-readable storage medium of claim 17, wherein the sparse transformation comprises at least one of thresholding, sparse coding, and spatial averaging.

22. The non-transitory computer-readable storage medium of claim 18, wherein the one or more respective nodes in the first and second frames form an artificial neural network.

23. The non-transitory computer-readable storage medium of claim 16, wherein the first time and the second time occur within a time window having a duration between 0.1 milliseconds to 10 seconds, inclusive.

* * * * *